United States Patent
Kawaguchi

(10) Patent No.: US 11,125,547 B2
(45) Date of Patent: Sep. 21, 2021

(54) SENSOR, SENSOR MODULE, WEARABLE TERMINAL, AND ELECTRONIC DEVICE

(71) Applicant: SONY CORPORATION, Tokyo (JP)

(72) Inventor: Hiroto Kawaguchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 271 days.

(21) Appl. No.: 16/311,119

(22) PCT Filed: Jun. 15, 2017

(86) PCT No.: PCT/JP2017/022197
§ 371 (c)(1),
(2) Date: Dec. 18, 2018

(87) PCT Pub. No.: WO2018/003527
PCT Pub. Date: Jan. 4, 2018

(65) Prior Publication Data
US 2020/0309508 A1    Oct. 1, 2020

(30) Foreign Application Priority Data

Jul. 1, 2016 (JP) .............................. JP2016-131722

(51) Int. Cl.
*G01R 15/16* (2006.01)
*G01B 7/16* (2006.01)
(52) U.S. Cl.
CPC ..................... *G01B 7/22* (2013.01)
(58) Field of Classification Search
CPC .. G01R 15/16; G01R 27/2605; G01R 31/312; G01B 7/22
See application file for complete search history.

(56) References Cited

U.S. PATENT DOCUMENTS

| 5,047,952 A | 9/1991 | Kramer et al. |
| 2004/0124018 A1* | 7/2004 | Yanagi .............. B60R 21/01516 177/144 |
| 2014/0176160 A1* | 6/2014 | Erkens ............... G01R 27/2605 324/658 |
| 2014/0375660 A1 | 12/2014 | Tamaki |

(Continued)

FOREIGN PATENT DOCUMENTS

| JP | 2002-071304 A | 3/2002 |
| JP | 2004-205410 A | 7/2004 |
| JP | 2005-043316 A | 2/2005 |

(Continued)

OTHER PUBLICATIONS

International Search Report and Written Opinion of PCT Application No. PCT/JP2017/022197, dated Sep. 12, 2017, 10 pages of ISRWO.

(Continued)

*Primary Examiner* — Jermele M Hollington
*Assistant Examiner* — Taqi R Nasir
(74) *Attorney, Agent, or Firm* — Chip Law Group

(57) ABSTRACT

A sensor includes an elastic base material including a first surface and a second surface, a first sensor which detects a change in a capacitance caused by expansion/contraction of the first surface, and a second sensor which detects a change in a capacitance caused by expansion/contraction of the second surface. The first sensor faces the second sensor with the base material therebetween.

17 Claims, 14 Drawing Sheets

(56) References Cited

U.S. PATENT DOCUMENTS

2017/0265780 A1* 9/2017 Lee .................. G06F 1/163

FOREIGN PATENT DOCUMENTS

| JP | 2011-133329 A | 7/2011 |
| JP | 2011-232322 A | 11/2011 |
| JP | 2014-219263 A | 11/2014 |
| JP | 2015-026371 A | 2/2015 |
| JP | 2015-197382 A | 11/2015 |

OTHER PUBLICATIONS

Office Action for JP Patent Application No. 2018-525045, dated Jul. 13, 2021, 04 pages of English Translation and 04 pages of Office Action.

* cited by examiner

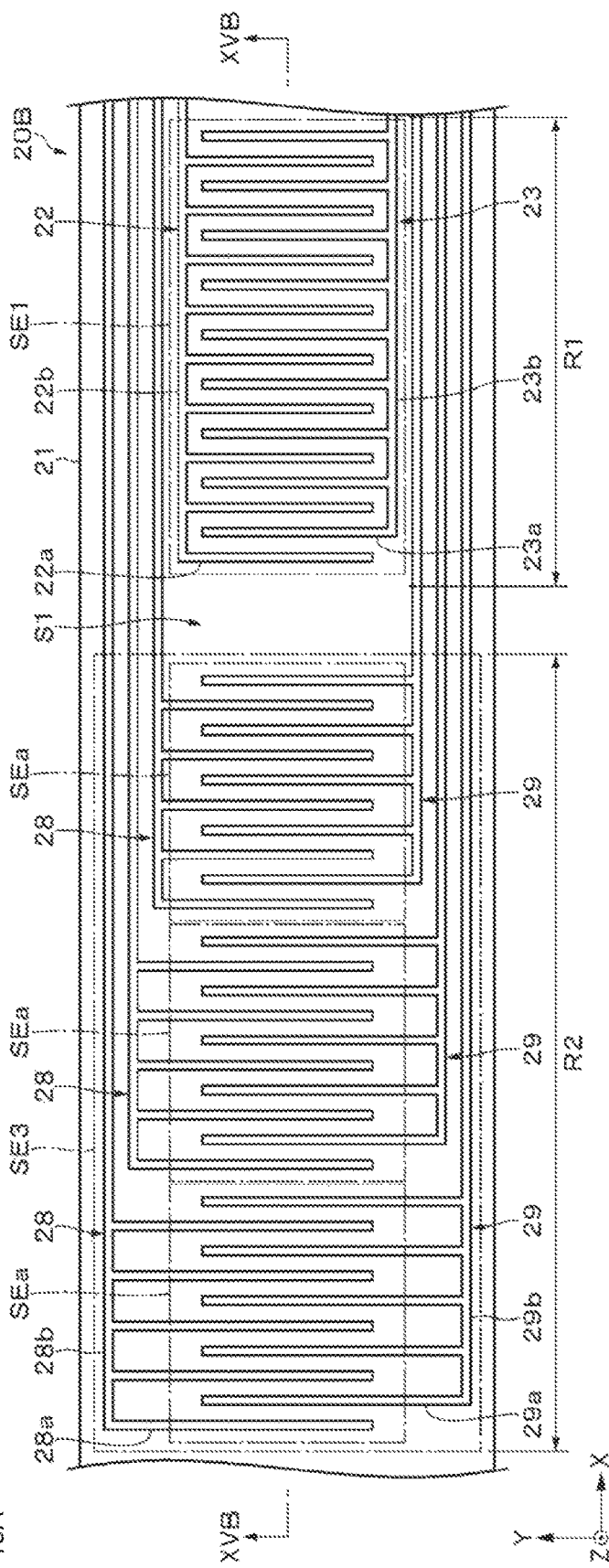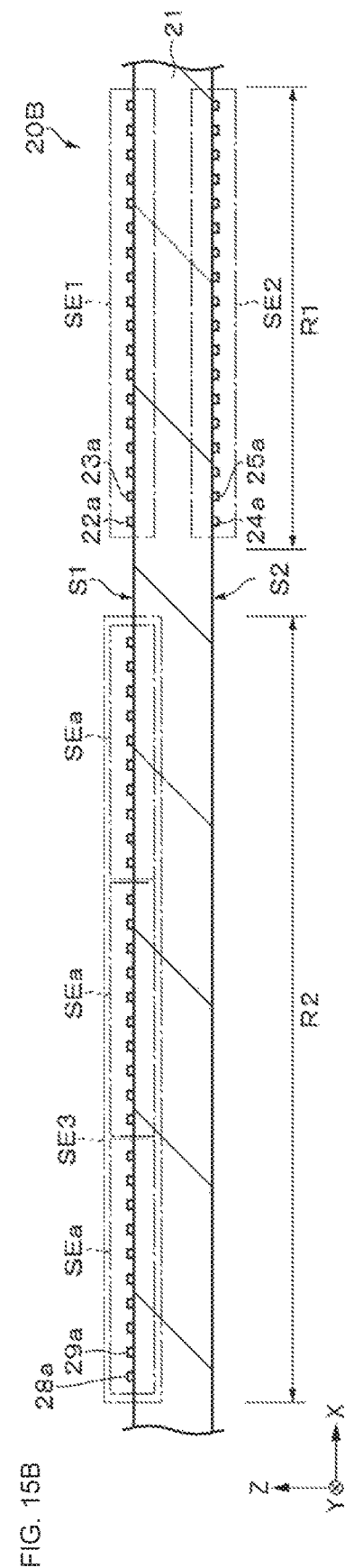
FIG. 15A
FIG. 15B

SENSOR, SENSOR MODULE, WEARABLE TERMINAL, AND ELECTRONIC DEVICE

CROSS REFERENCE TO RELATED APPLICATIONS

This application is a U.S. National Phase of International Patent Application No. PCT/JP2017/022197 filed on Jun. 15, 2017, which claims priority benefit of Japanese Patent Application No. JP 2016-131722 filed in the Japan Patent Office on Jul. 1, 2016. Each of the above-referenced applications is hereby incorporated herein by reference in its entirety.

TECHNICAL FIELD

The present technology relates to an electrostatic capacitance type sensor, a sensor module including the same, a wearable terminal, and an electronic device.

BACKGROUND ART

In recent years, technologies for measuring deformation of a soft object such as cushions and balls and movements of a human body such as an arm and a finger have been studied. For example, by finely measuring a distance to an object surface with an optical measuring method using a laser displacement meter and the like, deformation of the object occurred at the time when the soft object is pressed by a finger can be measured. The movement of the human body can be measured with the above method.

The optical measuring method has an advantage that the deformation and the movement of the target can be measured without having contact. In other words, there is an advantage that the measurement does not affect the deformation and the movement of the target. However, the above optical measuring method has a disadvantage that a part which is not irradiated with measuring light cannot be measured. For example, in a case where a state of fingers of a clenched hand is measured, since it is easy to project the measuring light on the outer side of the fingers, the state of the outer side of the fingers can be measured. However, since it is difficult to project the measuring light on the inner side of the fingers, it is difficult to measure the state of the inner side of the fingers.

Therefore, a technology has been proposed for measuring the deformation and the movement of the target by bonding the sensor to the object itself. This sensor is a so-called flexible sensor or is referred to as a stretchable sensor, and has a configuration in which an electrode is formed on a soft and elastic base material (for example, refer to Patent Document 1). For example, a sensor having cushioning characteristics which measures body pressure distribution in a state where a person is sitting or lying has been put to practical use.

CITATION LIST

Patent Document

Patent Document 1: Japanese Patent Application Laid-Open No. 2014-219263

SUMMARY OF THE INVENTION

Problems to be Solved by the Invention

An object of the present technology is to provide a novel sensor which can be attached to a soft object and a human body, a sensor module including the same, a wearable terminal, and an electronic device.

Solutions to Problems

To solve the above problems, a first technology is a sensor which includes an elastic base material including a first surface and a second surface, a first sensor which detects a change in a capacitance caused by expansion/contraction of the first surface, and a second sensor which detects a change in a capacitance caused by expansion/contraction of the second surface, in which the first sensor faces the second sensor with the base material therebetween.

A second technology is a sensor module including the sensor of the first technology and a control unit which measures bending and expansion/contraction of the sensor from the capacitance of the first sensor and the capacitance of the second sensor.

A third technology is a wearable terminal including the sensor of the first technology.

A fourth technology is an electronic device including the sensor of the first technology.

Effects of the Invention

According to the present technology, a novel sensor that can be attached to a soft object or a human body can be realized.

BRIEF DESCRIPTION OF DRAWINGS

FIG. 15A is a plan view of a configuration of a first surface of a sensor. FIG. 15B is a cross-sectional view taken along a line XVB-XVB of FIG. 15A.

MODE FOR CARRYING OUT THE INVENTION

Embodiments of the present technology will be described in the following order.
1 First Embodiment (Examples of Sensor, Sensor Module, and Electronic Device Including the Same)
  1.1 Electronic Device
  1.2 Configuration of Sensor
  1.3 Change in Capacitances of First and Second Sensors
  1.4 Operation of Controller IC
  1.5 Effect
  1.6 Modification
2 Second Embodiment (Example of Sensor Including Base Material with Ground Electrode)
  2.1 Configuration of Sensor
  2.2 Effect
  2.3 Modification
3 Third Embodiment (Examples of Sensor, Sensor Module, and Electronic Device Including the Same)
  3.1 Configuration of Electronic Device
  3.2 Configuration of Sensor
  3.3 Effect
  3.4 Modification 1 First Embodiment

[1.1 Configuration of Electronic Device]

Figure 1:
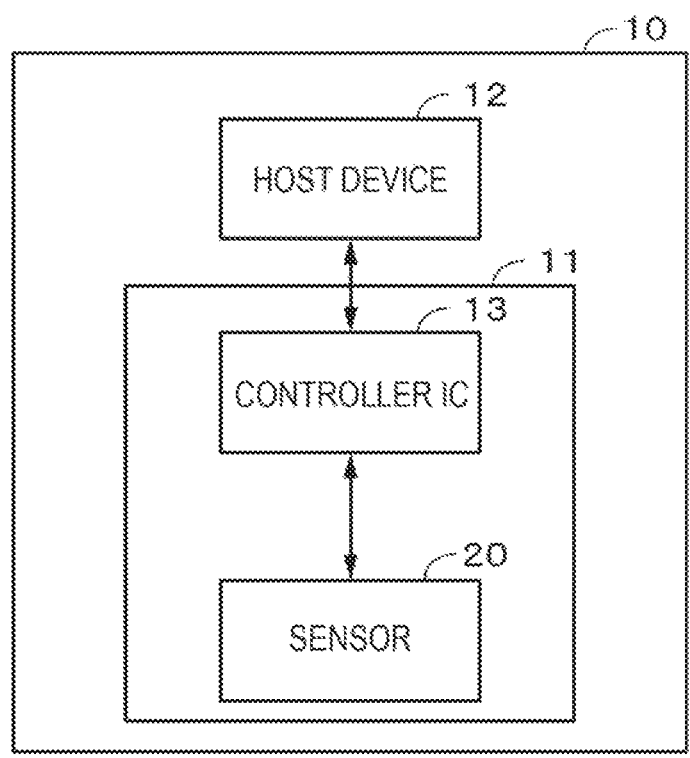
FIG. 1 is a block diagram of a configuration of an electronic device according to a first embodiment of the present technology.

As illustrated in FIG. 1, an electronic device 10 according to a first embodiment of the present technology includes a sensor module 11 and a host device 12 which is a main body of the electronic device 10. The electronic device 10 can measure movement of a human body and deformation of an object and may be a wearable terminal such as a smartwatch, a wristband, a ring, glasses, shoes, or clothes.

(Sensor Module)

As illustrated in FIG. 1, the sensor module 11 includes a sensor 20 and a controller IC 13 as a control unit. The sensor module 11 can measure a bend and expansion/contraction of the sensor 20 at the same time. Therefore, the sensor module 11 can measure complicated deformation of an object and movement of a human body to which the sensor 20 is attached. A sensor module 11A calculates a bending amount and an expansion/contraction amount of the sensor 20 on the basis of an output signal from the sensor 20 and outputs the calculated amount to the host device 12.

(Sensor)

The sensor 20 has elasticity and can be attached to a human body and an object. The sensor 20 detects a capacitance according to the bend and the expansion/contraction of the sensor 20 and outputs an output signal according to the capacitance to the controller IC 13.

Hereinafter, an example of attachment of the sensor 20 to a human body or an object will be described.

<Attachment to Human Body>

For example, the movement of the human body can be measured by attaching the sensor 20 to a movable part of a human body such as a finger, a wrist, an elbow, and the like.

As a form of the sensor 20, for example, a glove, a wristband, a supporter for sports, a ring, glasses, shoes, insoles, clothes, and the like are exemplified. However, the sensor 20 is not limited to these.

By attaching the sensor 20 to the human body, for example, the following operations can be achieved.

Acquisition of information necessary for improving athletic ability by measuring a joint motion at the time of exercise Operation of game machines and various machines by measuring fine operations of a fingertip at the time of work Operation of game machines and various machines by measuring a rotation state of a wrist caused by a movement of muscle of a wrist and a movement of a fingertip Acquisition of information necessary for operating game machines and various machines and improving walking and running by measuring a movement of soles at the time of walking and running <Attachment to Object>

A deformation state of an object can be measured by attaching the sensor 20 to a relatively soft object such as a pillow, a cushion, and a bed mat.

By attaching the sensor 20 to the object, for example, the following operations can be achieved.

Improvement of a sleeping condition and optimization of bedding by measuring a posture at the time of sleeping Improvement of a sitting posture and optimization of a sitting tool by measuring a deformation of a cushion and a chair at the time of sitting (Controller IC)

The controller IC 13 determines whether the sensor 20 is bent or expanded/contracted on the basis of the output signal according to the capacitance supplied from the sensor 20 and outputs the bending amount and the expansion/contraction amount of the sensor 20 to the host device 12.

(Host Device)

The host device 12 executes various processing on the basis of information supplied from the controller IC 13. The host device 12 can communicate with an external device on the basis of a predetermined wireless communication standard such as Bluetooth (registered trademark) and can exchange information with the external device. The host device 12 may wirelessly supply data obtained by the sensor 20 to the external device. As an external device, a tablet-type computer, a personal computer, a mobile phone such as a smartphone, a portable game machine, and the like can be exemplified. However, the external device is not limited to these.

Note that the host device 12 may wiredly communicate with the external device and exchange information with the external device. In this case, the host device 12 may wiredly supply the data obtained by the sensor 20 to the external device. Furthermore, the host device 12 may include a display device such as a liquid crystal display, an Electro Luminescence (EL) display, and an electronic paper and may display the data obtained by the sensor 20.

Figure 2A:
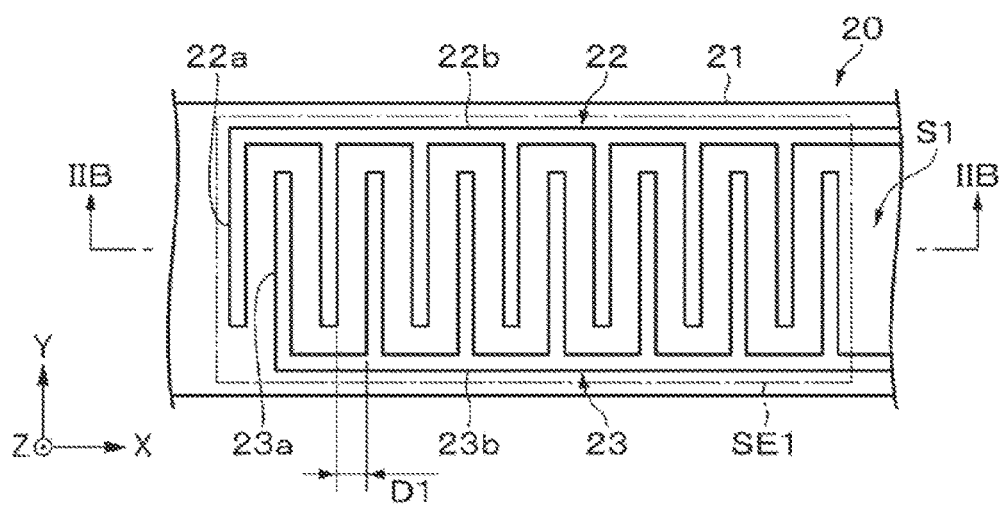
FIG. 2A is a plan view of a configuration of a first surface of a sensor.
Figure 2B:
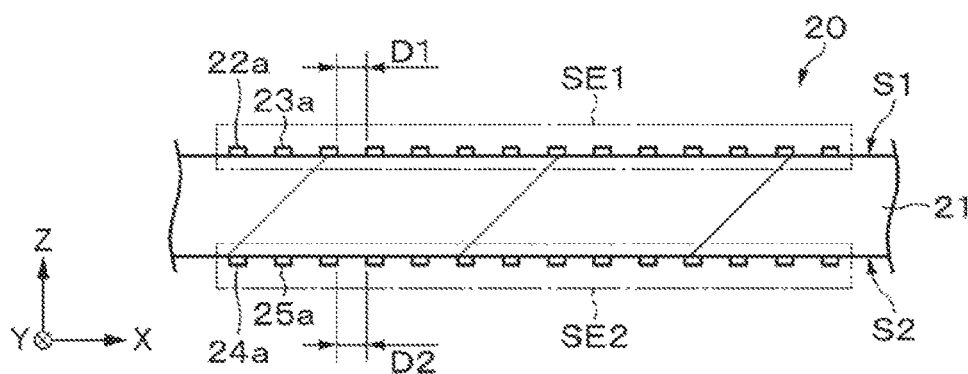
FIG. 2B is a cross-sectional view taken along a line IIB-IIB of FIG. 2A.
Figure 2C:
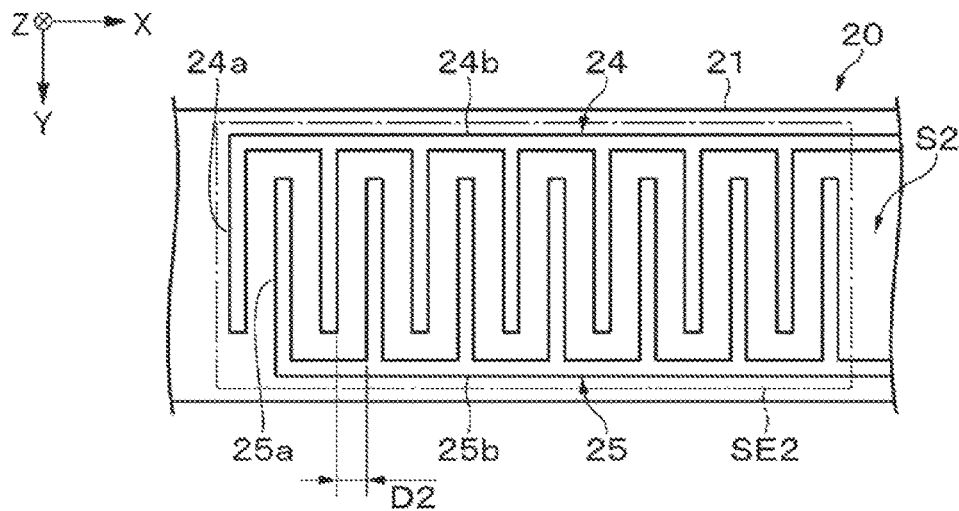
FIG. 2C is a plan view of a configuration of a second surface of the sensor.

[1.2 Configuration of Sensor] The sensor 20 is a sheet having flexibility. As illustrated in FIGS. 2A, 2B, and 2C, the sensor 20 includes an elastic base material 21, an electrostatic capacitance first sensor SE1 which is provided on a first surface S1 and detects a change in a capacitance caused by expansion/contraction of the first surface S1, and an electrostatic capacitance second sensor SE2 which is provided on a second surface S2 and detects a change in a capacitance caused by expansion/contraction of the second surface S2. The first sensor SE1 faces the second sensor SE2 with the base material 21 therebetween. The first sensor SE1 and the second sensor SE2 facing each other form a sensing unit for measuring the bend and the expansion/contraction of the sensor 20.

As viewing the sensor 20 from a direction perpendicular to the first surface S1 or the second surface S2, the sensor 20 has a band-like shape. The sensor 20 may have transparency with respect to visible light and may have opacity. Here, axes orthogonal to each other in the first surface S1 or the second surface S2 are referred to as an X axis and a Y axis, and an axis perpendicular to the first surface S1 or the second surface S2 is referred to as a Z axis. Furthermore, to bend the sensor 20 so that the first surface S1 is convexed is referred to as upward bending (refer to FIG. 4A), and to bend the sensor 20 so that the second surface S2 is convexed is referred to as downward bending (refer to FIG. 4B).

(Base Material)

The base material 21 has a sheet-like shape. The base material 21 includes, for example, an insulating elastomer as an insulating elastic material. The base material 21 may contain an additive agent as necessary. As an additive agent, for example, one or more of a cross-linker agent, a plasticizing agent, an antioxidant, a surfactant agent, a viscosity modifier, a reinforcing agent, a coloring agent, and the like can be used. As the insulating elastomer, for example, one or more of silicone resin, acrylic resin, urethane resin, and the like can be used.

(First and Second Sensors)

The first sensor SE1 is provided on the first surface S1 and includes elastic first and second electrodes 22 and 23. The second sensor SE2 is provided on the second surface S2 and includes elastic third and fourth electrodes 24 and 25. The first to fourth electrodes 22 to 25 are connected to the controller IC 13 via a Flexible Printed Circuit (FPC) which is not shown. One of the first and second electrodes 22 and 23 is grounded, and one of the third and fourth electrodes is grounded.

The first and second electrodes 22 and 23 are configured to form capacitive coupling, and the third and fourth electrodes 24 and 25 are configured to form capacitive coupling. The first and second electrodes 22 and 23 have comb-teeth shapes and are provided so as to mesh comb-teeth portions with each other on the first surface S1. Similarly, the third and fourth electrodes 24 and 25 have comb-teeth shapes and are provided so as to mesh comb-teeth portions with each other on the second surface S2.

The first electrode 22 includes a plurality of linear electrode element portions 22a and a linear coupling portion 22b. The second electrode 23 includes a plurality of linear electrode element portions 23a and a linear coupling portion 23b. The plurality of electrode element portions 22a and 23a is extended in the Y-axis direction and alternately provided at predetermined intervals toward the X-axis direction. The electrode element portions 22a and 23a adjacent to each other can form capacitive coupling.

The coupling portion 22b is provided at one end of the plurality of electrode element portions 22a and 23a and is extended to the Y-axis direction. One end of the plurality of electrode element portions 22a is coupled to the coupling portion 22b, and one end of the plurality of electrode element portions 23a is separated from the coupling portion 22b by a predetermined distance. The coupling portion 23b is provided at the other end of the plurality of electrode element portions 22a and 23a and is extended to the Y-axis direction. The other end of the plurality of electrode element portions 23a is coupled to the coupling portion 22b, and the other end of the plurality of electrode element portions 22a is separated from the coupling portion 22b by a predetermined distance.

The third electrode 24 includes a plurality of linear electrode element portions 24a and a linear coupling portion 24b. The fourth electrode 25 includes a plurality of linear electrode element portions 25a and a linear coupling portion 25b. The electrode element portions 24a and 25a and the coupling portions 24b and 25b respectively have similar configuration to the electrode element portions 22a and 23a and the coupling portions 22b and 23b.

The first to fourth electrodes 22 to 25 have elasticity and are configured to be deformable according to the bend and the expansion/contraction of the base material 21. Each of the first to fourth electrodes 22 to 25 includes, for example, a conductive material and a binder (binding agent). The first to fourth electrodes 22 to 25 may further contain an additive agent as necessary. Each of the first to fourth electrodes 22 to 25 may be an opaque electrode having opacity with respect to visible light and may be a transparent electrode having transparency with respect to visible light.

The conductive material may be conductive particles. The shape of the conductive particle may be, for example, a spherical, ellipsoidal, needle-like, plate-like, scale-like, tubular, wire-like, bar-like (rod-like), an irregular shapes, and the like. However, the shape of the conductive particle is not limited to these. Note that two or more kinds of particles having above shapes may be used in combination.

As the conductive material, one or more of a metal, a metal oxide, a carbon material, and a conductive polymer can be used. Here, it is defined that metal includes semimetal. As a metal, for example, metals such as copper, silver, gold, platinum, palladium, nickel, tin, cobalt, rhodium, iridium, iron, ruthenium, osmium, manganese, molybdenum, tungsten, niobium, tantalum, titanium, bismuth, antimony, lead, an alloy thereof, or the like are exemplified. However, the metal is not limited to these. As a metal oxide, for example, indium tin oxide (ITO), zinc oxide, indium oxide, antimony added tin oxide, fluorine added tin oxide, aluminum added zinc oxide, gallium added zinc oxide, silicon added zinc oxide, zinc oxide-tin oxide type, indium oxide-tin oxide type, zinc oxide-indium oxide-magnesium oxide type, and the like are exemplified. However, the metal oxide is not limited to these.

As a carbon material, for example, carbon black, porous carbon, carbon fiber, fullerene, graphene, carbon nanotube, carbon microcoil, nanohorn, and the like are exemplified. However, the carbon material is not limited to these. As a conductive polymer, for example, substituted or non-substituted polyaniline, polypyrrole, polythiophene, a polymer (copolymer) composed of one or more kinds selected from among these, and the like can be used. However, the conductive polymer is not limited to these.

It is preferable to use an elastomer as a binder. This is because excellent elasticity can be applied to the first to fourth electrodes 22 to 25. As an elastomer, for example, one or more of silicone resin, acrylic resin, urethane resin, and the like can be used. As an additive agent, for example, one or more of a cross-linker agent, a plasticizing agent, an antioxidant, a surfactant agent, a viscosity modifier, a reinforcing agent, a coloring agent, and the like can be used.

As a material of the first to fourth electrodes 22 to 25, for example, conductive ink in which metal powders are dispersed in thermoplastic resin or thermosetting resin having high elasticity, conductive ink using a carbon nanotube as a conductor, conductive ink in which silver nanowires are dispersed in solvent, rolled copper or electrolytic copper foil used for a flexible printed board, a metal film formed by a plating method, a metal film formed by sputtering, vapor deposition, or the like, an oxide conductive film such as an ITO, an organic conductor such as PEDOT/PSS, a conductive fiber formed by, for example plating a metal film on the fiber, and the like may be used.

As a method of forming the first to fourth electrodes 22 to 25, for example, printing methods such as screen printing, gravure printing, gravure offset printing, flexographic printing, and inkjet printing, and a patterning method using photolithography, and the like can be used.

[1.3 Change in Capacitances of First and Second Sensors]

Hereinafter, with reference to FIGS. 3A, 3B, 4A, and 4B and Table 1, an example of changes in capacitances of the first sensor SE1 and the second sensor SE2 at the time of expanding/contracting and bending the sensor 20 will be described. Here, to simplify the description, a state in which sensor 20 is not expanded/contracted and bent and the first surface S1 and the second surface S2 are planar is assumed as an initial state.

Here, the capacitances of the first sensor SE1 and the second sensor SE2 are respectively indicated by symbols C1 and C2, and capacitances of the first sensor SE1 and the second sensor SE2 in the initial state (initial capacitance) are respectively indicated by symbols C1(0) and C2(0). Furthermore, changes in the capacitances of the first sensor SE1 and the second sensor SE2 from the initial state are respectively indicated by symbols $\Delta C1$ ($=C1-C1(0)$) and $\Delta C2$ ($=C1-C2(0)$), the sum of $\Delta C1$ and $\Delta C2$ is indicated by symbols $\Delta A$ ($=\Delta C1+\Delta C2$), and the difference between $\Delta C1$ and $\Delta C2$ is indicated by symbols $\Delta B$ ($=\Delta C1-\Delta C2$).

Table 1 illustrates examples of the capacitances C1 and C2 of the first sensor SE1 and the second sensor SE2, the changes in the capacitances $\Delta C1$ and $\Delta C2$, and the sum $\Delta A$ of and the difference $\Delta B$ between the changes in the capacitances at the time of expansion/contraction and bending of the sensor 20. Here, to simplify the description, in the initial state, C1=10 and C2=10 are satisfied.

TABLE 1

|  | C1 | C2 | $\Delta C1$ ($=C1 - C1 (0)$) | $\Delta C2$ ($=C2 - C2 (0)$) | $\Delta A$ ($=\Delta C1 + \Delta C2$) | $\Delta B$ ($=\Delta C1 - \Delta C2$) |
|---|---|---|---|---|---|---|
| INITIAL | 10 | 10 | 0 | 0 | 0 | 0 |
| EXPANSION | 8 | 8 | −2 | −2 | −4 | 0 |
| CONTRACTION | 12 | 12 | 2 | 2 | 4 | 0 |
| UPWARD BENDING | 8 | 12 | −2 | 2 | 0 | −4 |
| DOWNWARD BENDING | 12 | 8 | 2 | −2 | 0 | 4 |

(Change in Capacitance at the Time of Expansion)

Figure 3A:
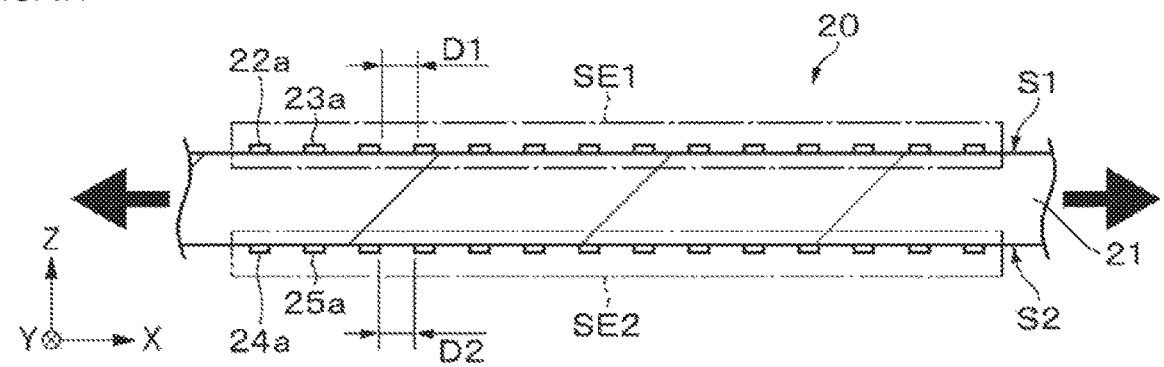
FIG. 3A is a cross-sectional view of a state of an expanded sensor.

As illustrated in FIG. 3A, when the sensor 20 is stretched to in-plane directions of the planar first surface S1 and second surface S2, the first surface S1 and the second surface S2 are expanded from the first surface S1 and the second surface S2 in the initial state. With this structure, an interval D1 between the electrode element portions 22a and 23a is increased from an interval D1 in the initial state, and the capacitance C1 of the first sensor SE1 is decreased. An interval D2 between the electrode element portions 24a and 25a is similarly increased from an interval D2 in the initial state, and the capacitance C2 of the second sensor SE2 is decreased.

For example, if the capacitances C1 and C2 are respectively changed to C1=8 and C2=8 as illustrated in Table 1 due to the expansion, $\Delta A=-4$ and $\Delta B=0$ are satisfied.

Therefore, it is found that in a case where the sensor 20 is expanded, $\Delta B$ is not changed from $\Delta B$ ($=0$) in the initial state, whereas $\Delta A$ is decreased from $\Delta A$ ($=0$) in the initial state and becomes negative. Furthermore, it is understood that as the value of $\Delta A$ is smaller, the expansion amount is larger. Therefore, it is understood that the expansion amount can be calculated on the basis of the value of $\Delta A$.

(Change in Capacitance at the Time of Contraction)

Figure 3B:
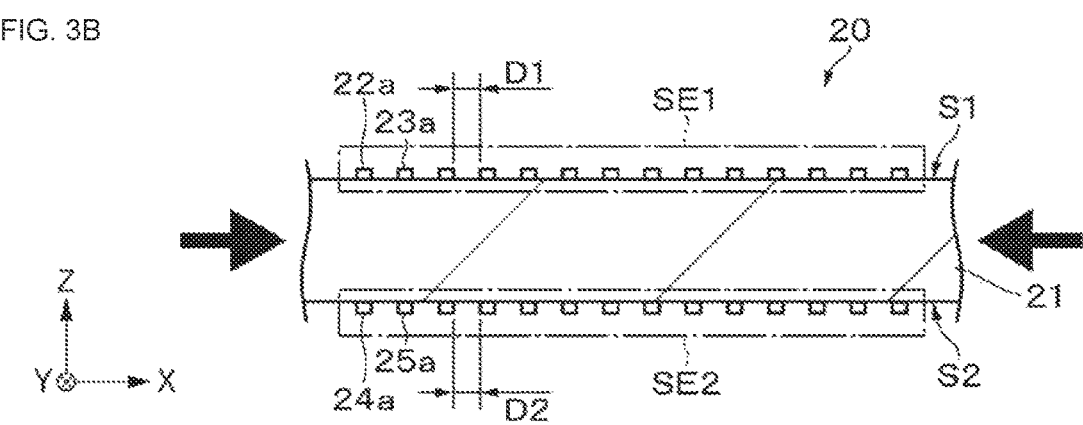
FIG. 3B is a cross-sectional view of a state of a contracted sensor.

As illustrated in FIG. 3B, when the sensor 20 is contracted to in-plane directions of the planar first surface S1 and second surface S2, the first surface S1 and the second surface S2 are contracted from the first surface S1 and the second surface S2 in the initial state. With this structure, the interval D1 between the electrode element portions 22a and 23a is decreased from the interval D1 in the initial state, and the capacitance C1 of the first sensor SE1 is increased. The interval D2 between the electrode element portions 24a and 25a is similarly decreased from the interval D2 in the initial state, and the capacitance C2 of the second sensor SE2 is increased.

For example, if the capacitances C1 and C2 are respectively changed to C1=12 and C2=12 as illustrated in Table 1 due to the contraction, $\Delta A=4$ and $\Delta B=0$ are satisfied. Therefore, it is found that, in a case where the sensor 20 is contracted, $\Delta B$ is not changed from $\Delta B$ ($=0$) in the initial state, whereas $\Delta A$ is increased from $\Delta A$ ($=0$) in the initial state and becomes positive. Furthermore, it is understood that as the value of $\Delta A$ is larger, the contraction amount is smaller. Therefore, it is understood that the contraction amount can be calculated on the basis of the value of $\Delta A$.

(Change in Capacitance at the Time of Upward Bending)

Figure 4A:
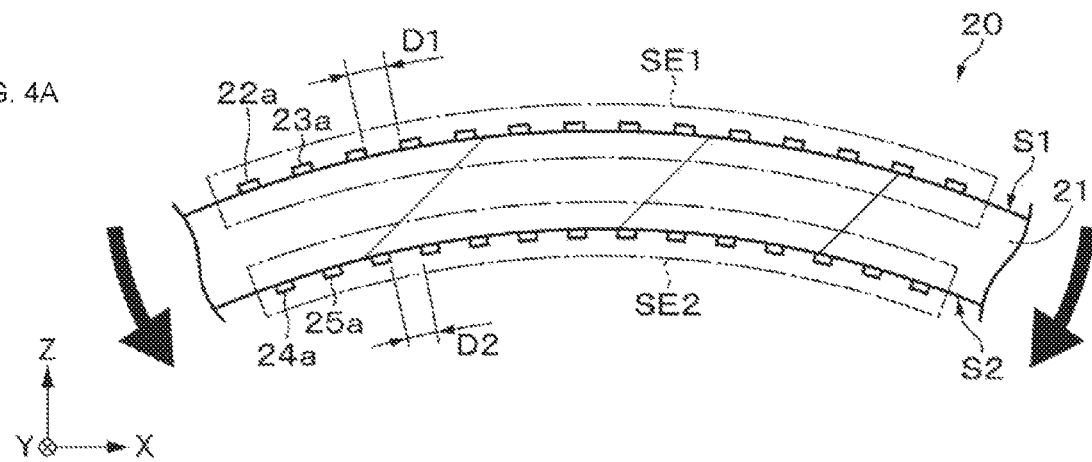
FIG. 4A is a cross-sectional view of a state of a bent sensor so that the first surface is convexed.

As illustrated in FIG. 4A, when the sensor 20 is bent so that the first surface S1 is convexed (when sensor 20 is bent upward), the first surface S1 is expanded from the first surface S1 in the initial state, and the second surface S2 is contracted from the second surface S2 in the initial state. With this structure, the interval D1 between the electrode element portions 22a and 23a is increased from the interval D1 in the initial state, and the capacitance C1 of the first sensor SE1 is decreased. Whereas, the interval D2 between the electrode element portions 24a and 25a is decreased from the interval D2 in the initial state, and the capacitance C2 of the second sensor SE2 is increased.

For example, if the capacitances C1 and C2 are respectively changed to C1=8 and C2=12 as illustrated in Table 1 by the upward bending, $\Delta A=0$ and $\Delta B=-4$ are satisfied. Therefore, it is found that in a case where the sensor 20 is expanded, $\Delta A$ is not changed from $\Delta A$ ($=0$) in the initial state, whereas $\Delta B$ is decreased from $\Delta B$ ($=0$) in the initial state and becomes negative. Furthermore, it is understood that as the value of $\Delta B$ is smaller, the amount of upward bending is larger. Therefore, it is understood that the upward bending amount can be calculated on the basis of the value of $\Delta B$ (Change in Capacitance at the Time of Downward Bending)

Figure 4B:
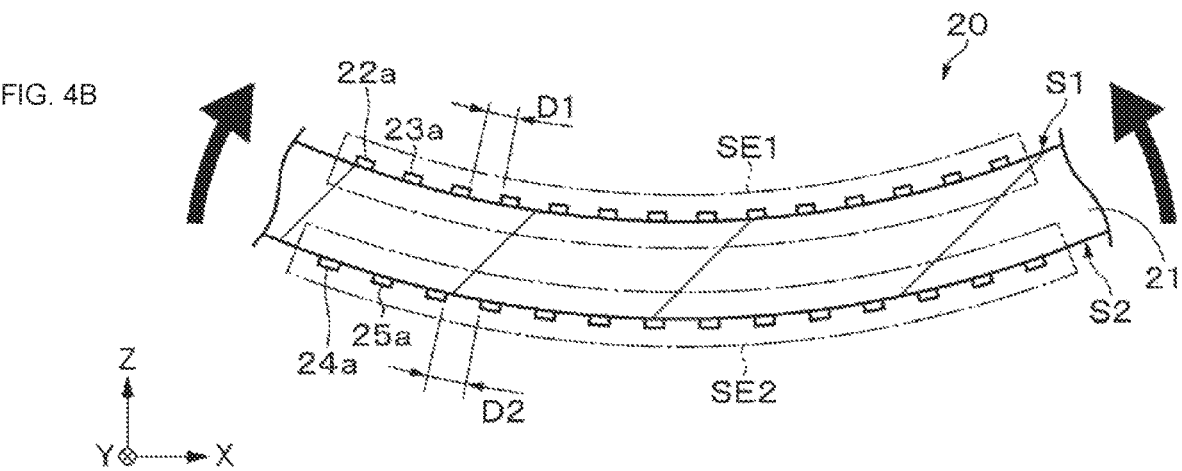
FIG. 4B is a cross-sectional view of a state of a bent sensor so that the second surface is convexed.

As illustrated in FIG. 4B, when the sensor 20 is bent so that the second surface S2 is convexed (sensor 20 is bent downward), the first surface S1 is contracted from the first surface S1 in the initial state, whereas the second surface S2 is expanded from the second surface S2 in the initial state. With this structure, the interval D1 between the electrode element portions 22a and 23a is decreased from the interval D1 in the initial state, and the capacitance C1 of the first sensor SE1 is increased. Whereas the interval D2 between the electrode element portions 24a and 25a is increased from the interval D2 in the initial state, and the capacitance C2 of the second sensor SE2 is decreased.

For example, if the capacitances C1 and C2 are respectively changed to C1=12 and C2=8 as illustrated in Table 1 by the upward bending, $\Delta A=4$ and $\Delta B=0$ are satisfied. Therefore, it is found that, in a case where the sensor 20 is expanded, $\Delta A$ is not changed from $\Delta A$ (=0) in the initial state, whereas $\Delta B$ is increased from $\Delta B$ (=0) in the initial state and becomes positive. Furthermore, it is understood that as the value of $\Delta B$ is larger, the amount of downward bending is larger. Therefore, it is understood that the downward bending amount can be calculated on the basis of the value of $\Delta B$.

Comprehensively considering the above description, the following can be found. In a case where the sensor 20 is not bent and expanded or contracted, only the value of $\Delta A$ is increased/decreased, and the value of $\Delta B$ is not changed. Therefore, the state of the expansion/contraction can be detected according to the value of $\Delta A$, and the amount of expansion/contraction can be measured. On the other hand, in a case where the sensor 20 is not expanded or contracted and is bent, the value of $\Delta A$ is not changed, and only the value of $\Delta B$ is increased/decreased. Therefore, the bending direction can be detected according to the value of $\Delta B$, and the bending amount can be measured.

[1.4 Operation of Controller IC]

The controller IC 13 concurrently detects the bend and the expansion/contraction of the sensor 20 from the capacitance C1 of the first sensor SE1 and the capacitance C2 of the second sensor SE2 and measures the amounts of the bend and the expansion/contraction. Specifically, the controller IC 13 concurrently detects the bend and the expansion/contraction of the sensor 20 from the sum $\Delta A$ (=$\Delta C1+\Delta C2$) of the changes in the capacitances $\Delta C1$ and $\Delta C2$ of the first sensor SE1 and the second sensor SE2 and the difference $\Delta B$ (=$\Delta C1-\Delta C2$) between the changes in the capacitances $\Delta C1$ and $\Delta C2$ of the first sensor SE1 and the second sensor SE2.

The controller IC 13 has a plurality of thresholds±a and ±b. The threshold+a is used to determine whether the sensor 20 is contracted, and the threshold−a is used to determine whether the sensor 20 is expanded. The threshold+b is used to determine whether the sensor 20 is bent downward, and the threshold−b is used to determine whether the sensor 20 is bent upward.

Note that, in the description on the change in the capacitance, an example has been described in a case where the sensor 20 is not expanded/contracted, $\Delta B=0$ is satisfied, and in a case where the sensor 20 is not bent, $\Delta A=0$ is satisfied (refer to Table 1). However, actually, even in a state where the sensor 20 is not substantially expanded/contracted or bent, $\Delta A=0$ and $\Delta B=0$ are not normally satisfied. In general, the value of $\Delta A$ takes a value which satisfies $\Delta A>0$ or $\Delta A<0$, and the value of $\Delta B$ takes a value which satisfies $\Delta B>0$ or $\Delta B<0$. In consideration of this point, it is preferable that a>0 and b>0 be set. However, it is also possible to set a=0 and b=0.

The controller IC 13 includes a memory as a recording unit, and stores a first conversion table for converting the value of $\Delta A$ into the expansion amount or the contraction amount of the sensor 20 and a second conversion table for converting the value of $\Delta B$ into the upward bending amount and the downward bending amount of the sensor 20 in the memory. The controller IC 13 calculates the values of $\Delta A$ and $\Delta B$ respectively from the capacitances C1 and C2 supplied from the first sensor SE1 and the second sensor SE2. The controller IC 13 converts the calculated $\Delta A$ into the expansion amount or the contraction amount by using the first conversion table and outputs the amount to the host device 12. Furthermore, the controller IC 13 converts the calculated $\Delta B$ into the upward bending amount or the downward bending amount by using the second conversion table and outputs the amount to the host device 12.

It is preferable that the controller IC 13 alternately drive (detection operation) the first sensor SE1 and the second sensor SE2 with time (time division). This is because crosstalk of the signals of the first sensor SE1 and the second sensor S2 via the base material 21 can be prevented.

Figure 5:
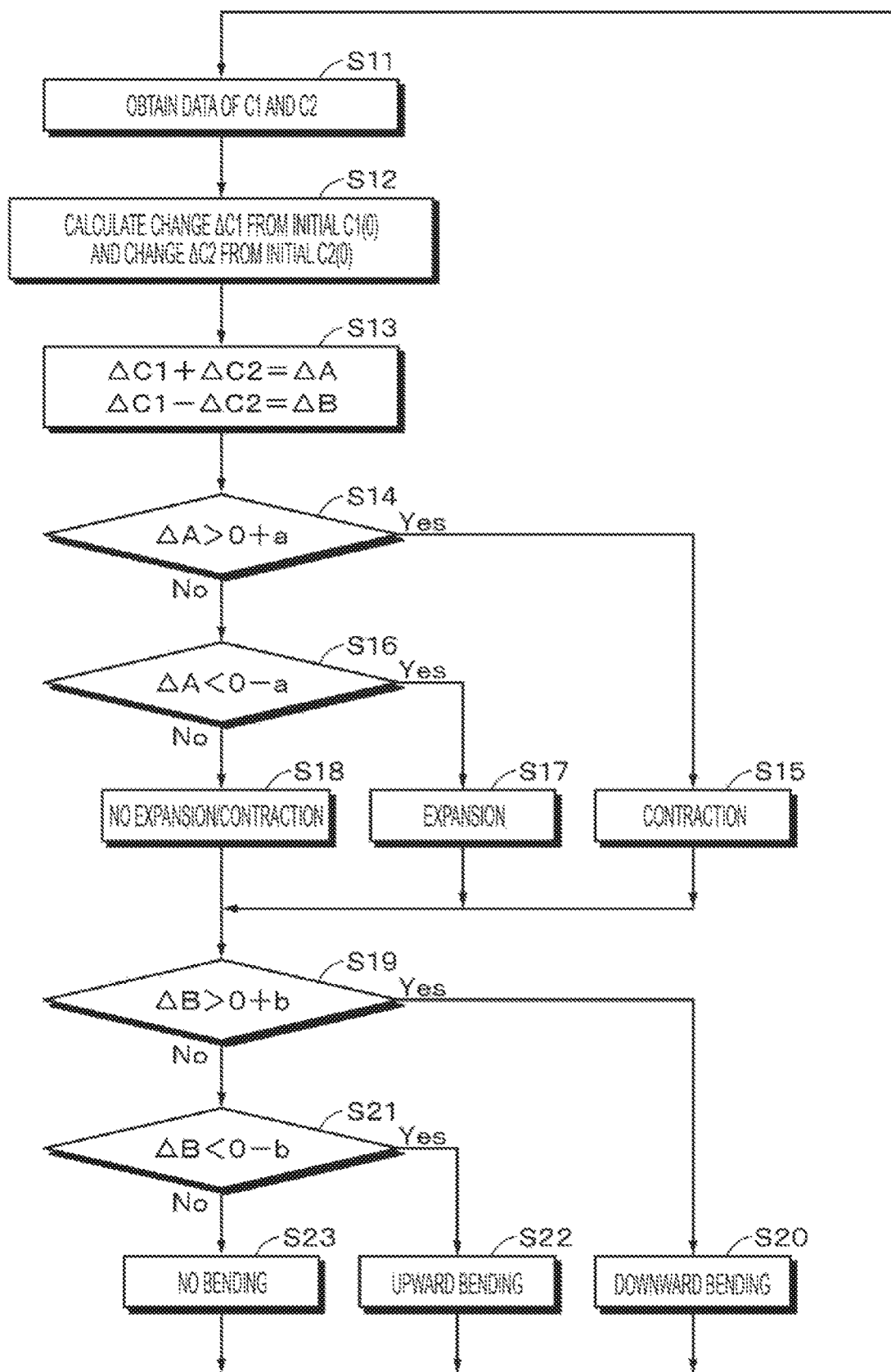
FIG. 5 is a flowchart for explaining an operation of a controller IC.

An exemplary operation of the controller IC 13 will be described below with reference to FIG. 5. Note that, it is assumed that the controller IC obtain initial capacitances C1(0) and C2(0) in advance and store the obtained capacitances in a memory as a storage unit prior to an operation to be described below.

First, in step S11, the controller IC 13 obtains the capacitances C1 and C2 of the first sensor SE1 and the second sensor SE2 at predetermined time intervals. Next, in step S12, the controller IC 13 calculates the changes in the capacitances $\Delta C1$ (=C1−C1(0)) and $\Delta C2$ (=C2−C2(0)) respectively from the initial capacitances C1(0) and C2(0) by using the obtained capacitances C1 and C2. Next, in step S13, the controller IC 13 calculates the sum $\Delta A$ (=$\Delta C1+\Delta C2$) of the values $\Delta C1$ and $\Delta C2$ and the difference $\Delta B$ (=$\Delta C1-\Delta C2$) between the values $\Delta C1$ and $\Delta C2$.

Next, in step S14, the controller IC 13 determines whether or not the value of $\Delta A$ is larger than the threshold a. In a case where it has been determined in step S14 that the value of $\Delta A$ is larger than the threshold a, in step S15, the controller IC 13 converts the value of $\Delta A$ into the contraction amount by using the first conversion table and outputs the amount to the host device 12. Then, the controller IC 13 proceeds the processing to step S19. On the other hand, in a case where it has been determined in step S14 that the value of $\Delta A$ is not larger than the threshold a, in step S16, the controller IC 13 determines whether or not the value of $\Delta A$ is smaller than the threshold−a.

In a case where it has been determined in step S16 that the value of $\Delta A$ is smaller than the threshold−a, in step S17, the controller IC 13 converts the value of $\Delta A$ into the expansion amount by using the first conversion table and outputs the amount to the host device 12. Then, the controller IC 13 proceeds the processing to step S19. On the other hand, in a case where it has been determined in step S16 that the value of $\Delta A$ is not smaller than the threshold−a, in step S18, the controller IC 13 determines that the sensor 20 is not expanded/contracted, and proceeds the processing to step S19.

Next, in step S19, the controller IC 13 determines whether or not the value of $\Delta B$ is larger than the threshold b. In a case where it has been determined in step S19 that the value of $\Delta A$ is larger than the threshold b, in step S20, the controller IC 13 converts the value of $\Delta B$ into the downward bending amount by using the second conversion table and outputs the amount to the host device 12. Then, the processing is returned to step S11. On the other hand, in a case where it has been determined in step S19 that the value of $\Delta A$ is not larger than the threshold b, in step S21, the controller IC 13 determines whether or not the value of $\Delta B$ is smaller than the threshold−b.

In a case where it has been determined in step S21 that the value of $\Delta A$ is smaller than the threshold−b, in step S22, the controller IC 13 converts the value of $\Delta B$ into the upward bending amount by using the second conversion table and outputs the amount to the host device 12. Then, the processing is returned to step S11. On the other hand, in a case where it has been determined in step S21 that the value of ΔA is not smaller than the threshold–b, in step S23, the controller IC 13 determines that the sensor 20 is not bent, and the processing is returned to step S11.

[1.5 Effect]

The sensor 20 according to the first embodiment includes an elastic base material including the first surface S1 and the second surface S2, the first sensor SE1 which detects the change in the capacitance caused by the expansion/contraction of the first surface S1, and the second sensor SE2 which detects the change in the capacitance caused by the expansion/contraction of the second surface S2. The first sensor SE1 faces the second sensor SE2 with the base material 21 therebetween. Therefore, a novel sensor which can be attached to a soft object and a human body can be realized.

The sensor module 11 according to the first embodiment includes the sensor 20 and the controller IC 13 which calculates the sum ΔA of and the difference ΔB between the changes in the capacitances ΔC1 and ΔC2 of the first sensor SE1 and the second sensor SE2 on the basis of the output signal from the sensor 20. The controller IC 13 can convert the calculated ΔA into the expansion amount/contraction amount of the sensor 20 and can convert the calculated ΔB into the upward bending amount/downward bending amount of the sensor 20. Therefore, it is possible to concurrently measure the bend and the expansion/contraction of the sensor 20. With this structure, in a case where the sensor 20 is attached to the human body, the sensor 20 can measure a movement of the human body. Furthermore, in a case where the sensor 20 is attached to the object, the sensor 20 can measure deformation of the object. Furthermore, since the bend and the expansion/contraction of the sensor 20 can be concurrently measured, fine deformation of the soft object and a complicated movement of the human body can be measured.

[1.6 Modification]

Figure 6A:
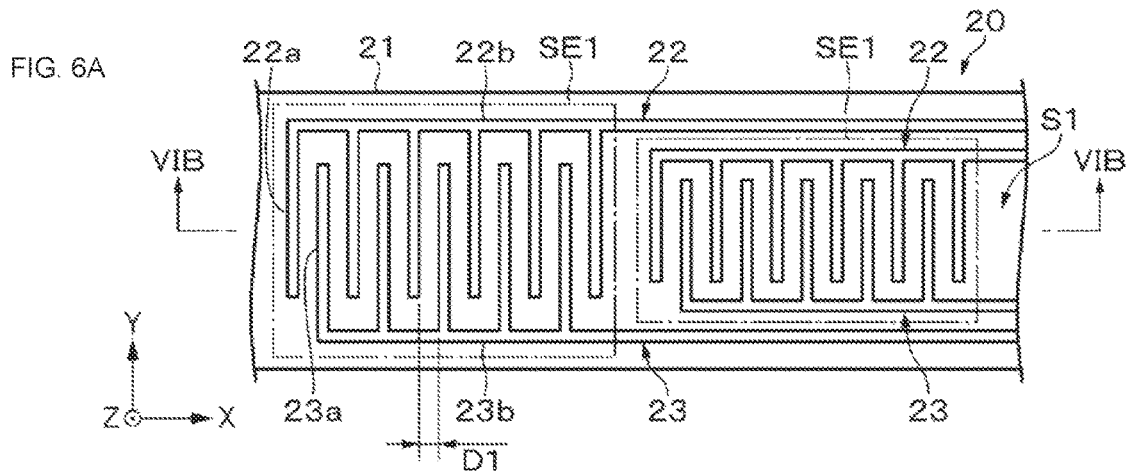
FIG. 6A is a plan view of a configuration of the first surface of the sensor.
Figure 6B:
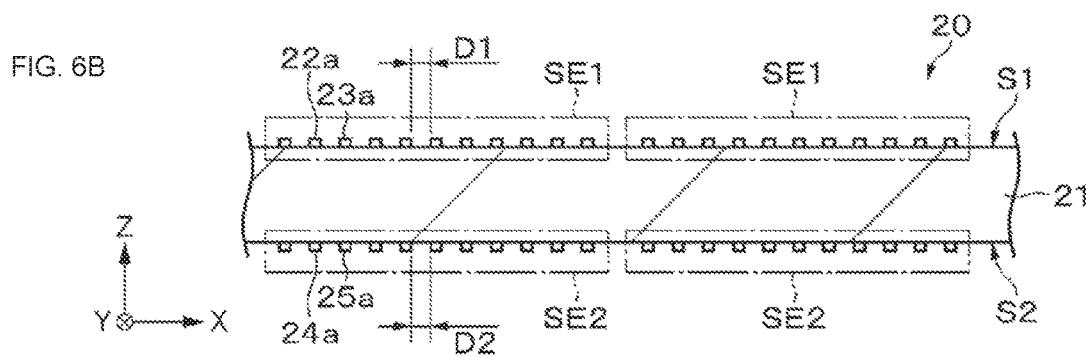
FIG. 6B is a cross-sectional view taken along a line VIB-VIB of FIG. 6A.
Figure 6C:
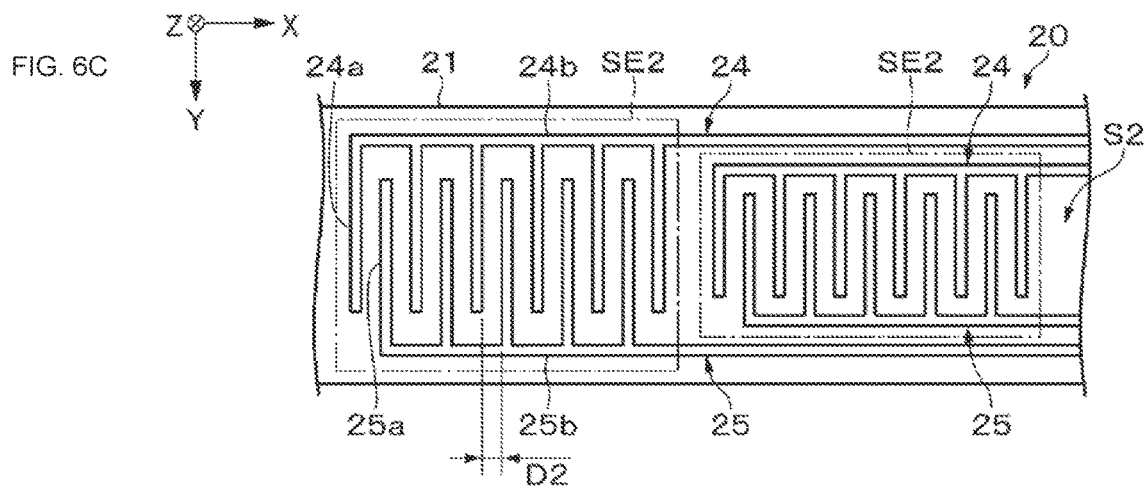
FIG. 6C is a plan view of a configuration of the second surface of the sensor.

(Modification 1) As illustrated in FIGS. 6A 6B, and 6C, it is possible that the plurality of first sensors SE1 is provided on the first surface S1, and the plurality of second sensors SE2 is provided on the second surface S2. A pair of the first sensor SE1 and the second sensor SE2 may face each other with the base material 21 therebetween. In a case where this configuration is adopted, the first and the second electrodes 22 and 23 are configured by individual electrodes of the plurality of first sensors SE1 as described above, and the third and the fourth electrodes 24 and 25 are configured by individual electrodes of the plurality of second sensors SE2. This method is applied to a mutual-capacitance-type sensor. In a case where a configuration is adopted in which the plurality of pairs of first sensors SE1 and second sensors SE2 is provided, it is possible to measure a local state of the expansion/contraction and the bend of the sensor 20.

Figure 7:
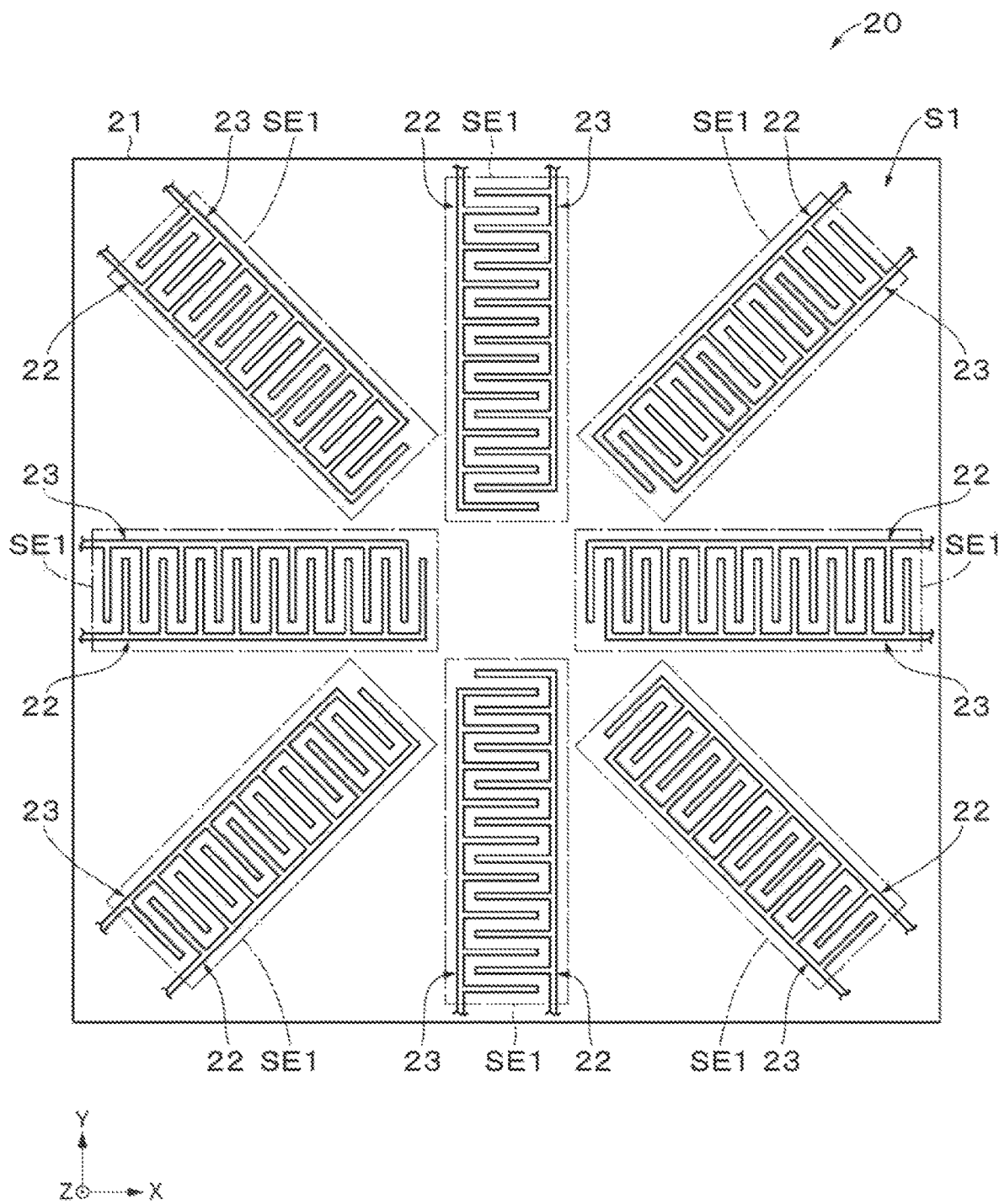
FIG. 7 is a plan view of a configuration of the first surface of the sensor.
Figure 8:
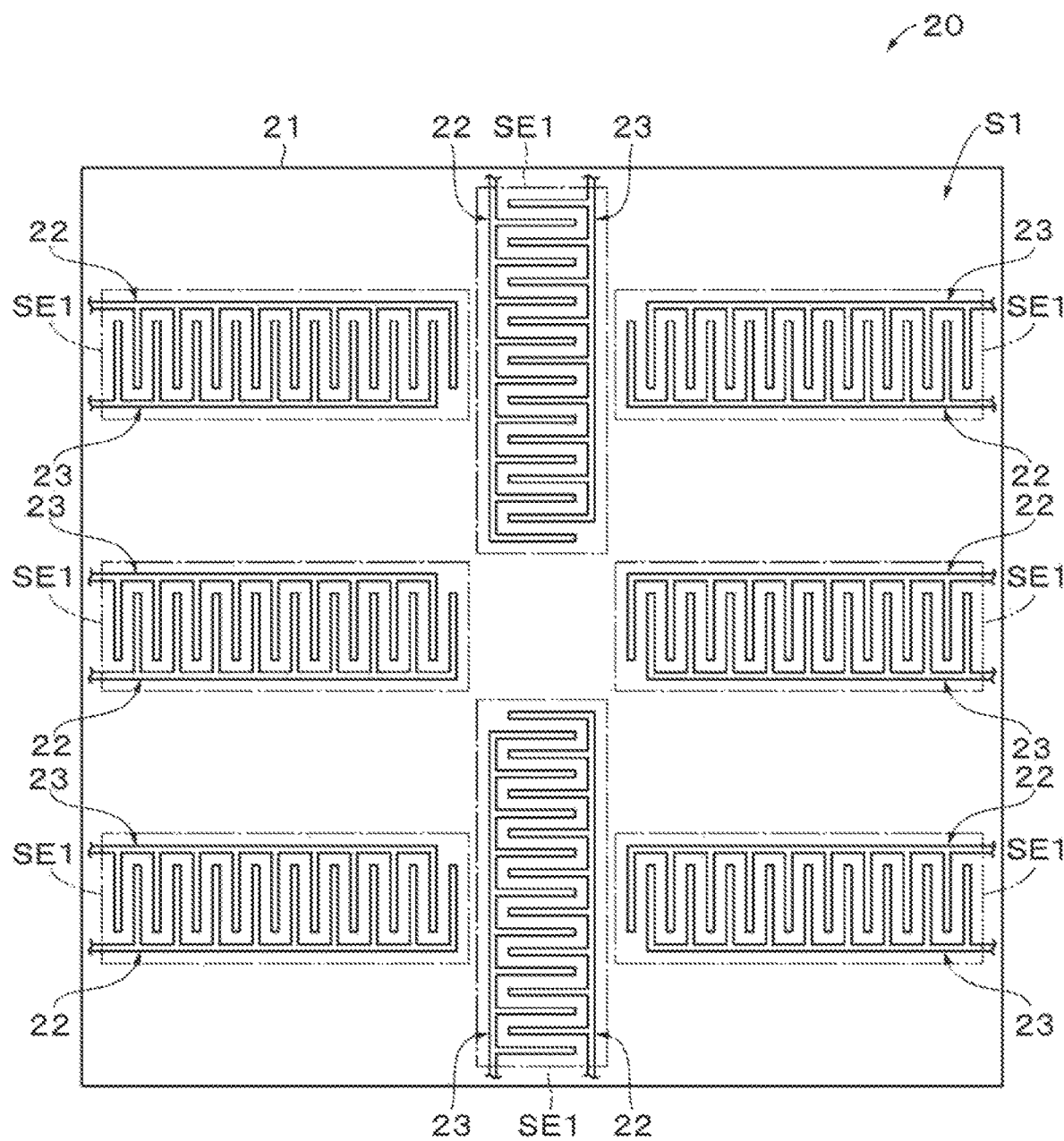
FIG. 8 is a plan view of a configuration of the first surface of the sensor.
Figure 9:
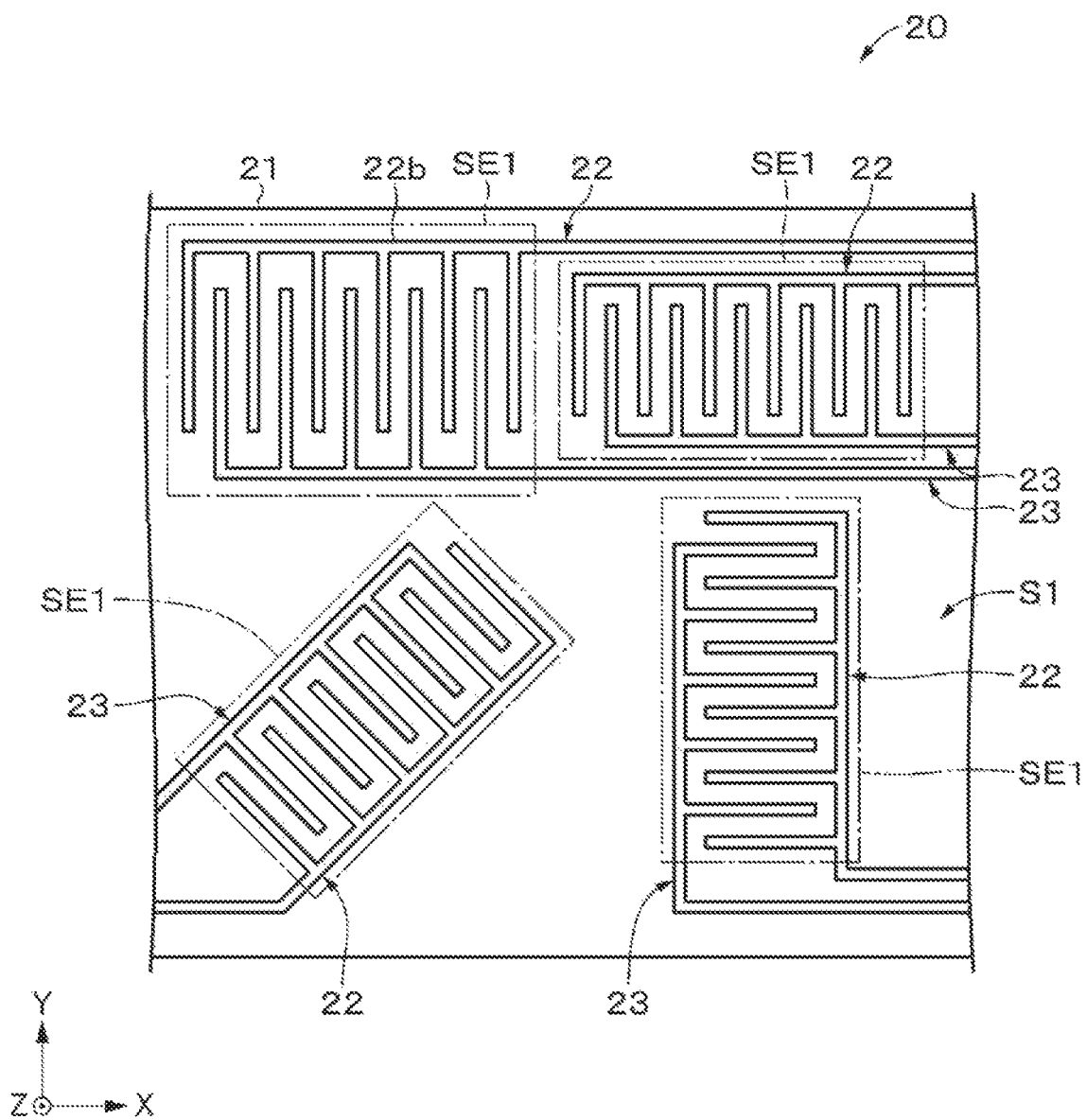
FIG. 9 is a plan view of a configuration of the first surface of the sensor.

The plurality of first sensors SE1 may be one-dimensionally arranged on the first surface S1 as illustrated in FIG. 6A and may be two-dimensionally arranged on the first surface S1 as illustrated in FIGS. 7 and 8. Furthermore, as illustrated in FIG. 9, it is possible that a part of the plurality of first sensors SE1 is one-dimensionally arranged on the first surface S1 and the other first sensors SE1 may be two-dimensionally arranged on the first surface S1. In FIG. 7, an example is illustrated in which the plurality of first sensors SE1 is radially and two-dimensionally arranged. In FIG. 8, an example is illustrated in which the plurality of first sensors SE1 is two-dimensionally arranged so as to form rows in the X and Y directions. However, two-dimensional arrangement is not limited to these, and various arrangement forms can be adopted in consideration of a target to which the sensor 20 is attached and the like. Note that the plurality of second sensors SE2 is arranged similarly to the plurality of first sensors SE1 on the second surface S2.

(Modification 2)

Figure 10A:
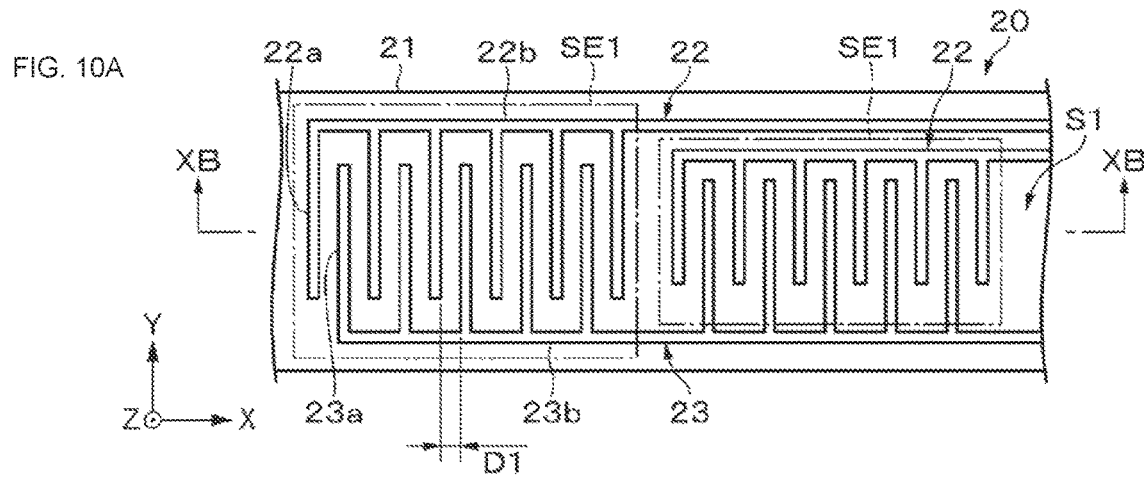
FIG. 10A is a plan view of a configuration of the first surface of the sensor.
Figure 10B:
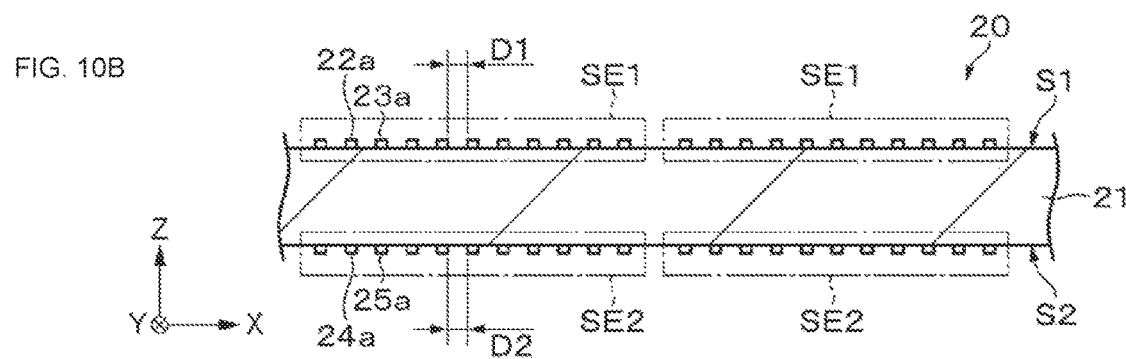
FIG. 10B is a cross-sectional view taken along a line XB-XB of FIG. 10A.
Figure 10C:
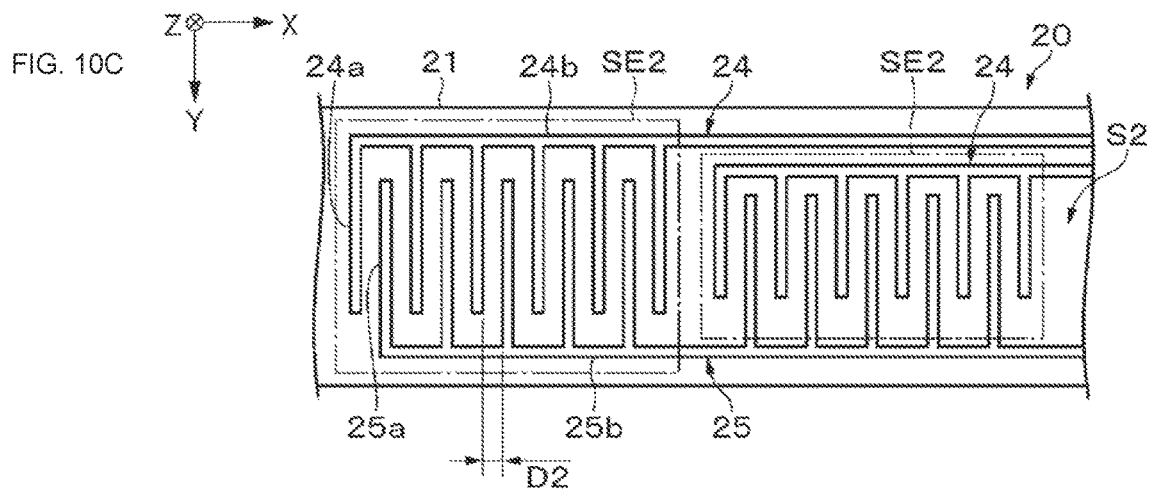
FIG. 10C is a plan view of a configuration of the second surface of the sensor.

Instead of the configurations of the first sensor SE1 and the second sensor SE2 in the modification 1, the following configuration may be adopted. In other words, as illustrated in FIGS. 10A, 10B, and 10C, it is possible that one of the first and second electrodes 22 and 23 is configured by an electrode shared by the plurality of first sensors SE1 and the other electrode is configured by an individual electrode of the plurality of first sensors SE1. Furthermore, one of the third and fourth electrodes 24 and 25 may be configured by an electrode shared by the plurality of second sensors SE2, and the other electrode may be configured by an individual electrode of the plurality of second sensors SE2. This method is applied to a self-capacitance-type sensor, and the shared electrode is used as a ground electrode in general.

Even in a case where the above configuration is adopted, similarly to the modification 1, the plurality of first sensors SE1 and second sensors SE2 may be one-dimensionally arranged on the first surface S1 and the second surface S2 and may be two-dimensionally arranged.

(Modification 3)

Figure 11A:
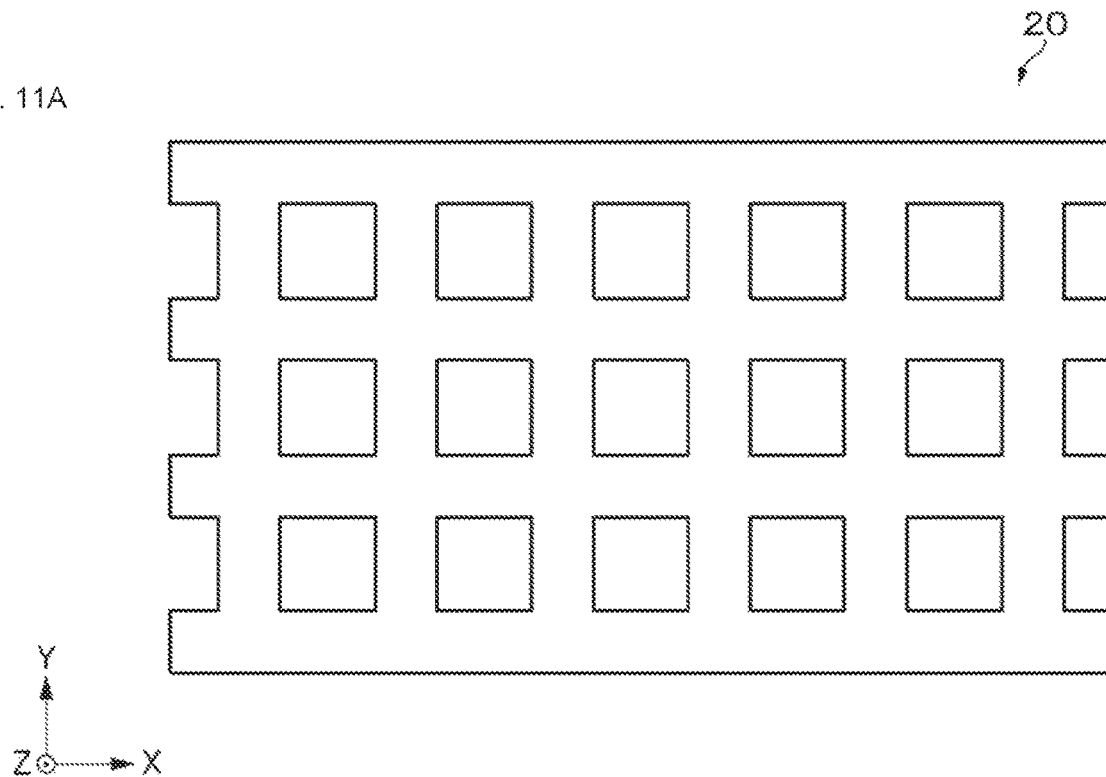
FIG. 11A is a plan view of a mesh-shaped sensor.
Figure 11B:
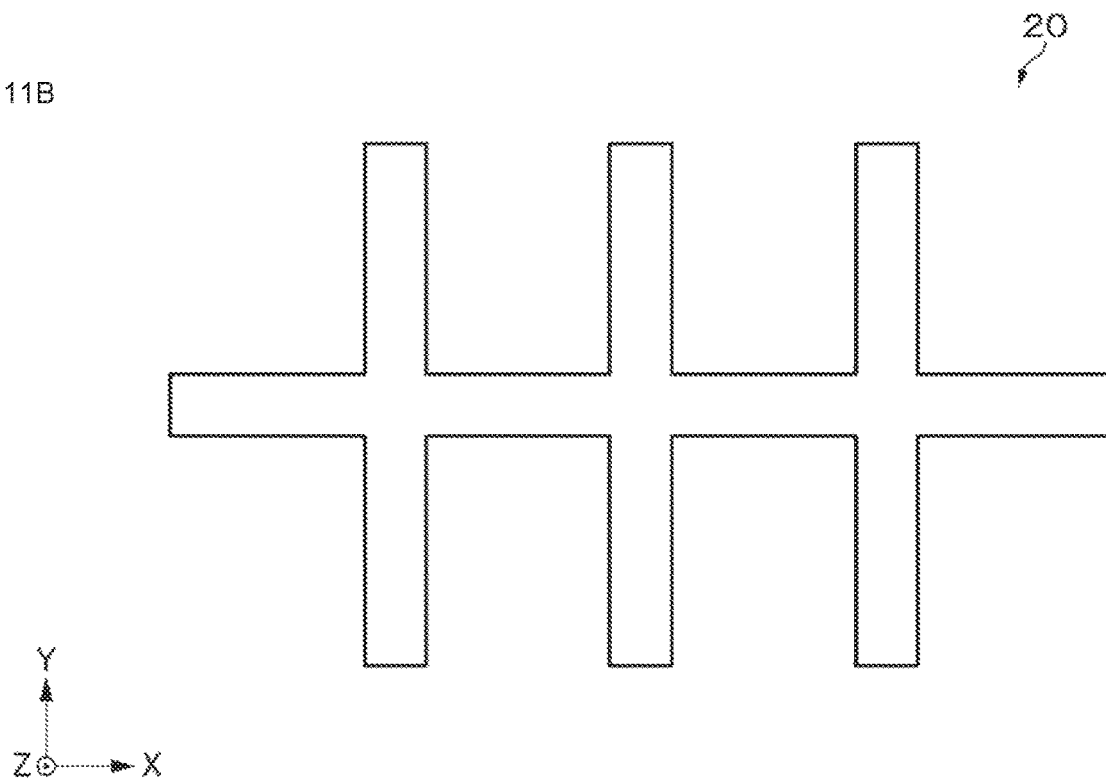
FIG. 11B is a plan view of a branched sensor.

In the first embodiment, a case where the sensor 20 has a band-like shape has been described. However, the shape of the sensor 20 is not limited to this and can be selected according to a target to which the sensor 20 is attached. For example, in consideration of attaching the sensor 20 to a curved object, a soft object, or the like, the sensor 20 may have a meshed shape as illustrated in FIG. 11A, and may have a branched shape as illustrated in FIG. 11B. In addition to this, various shapes such as a radial, stripe, meander, concentric, spiral, spider-web, fish bone, ring, lattice, and irregular shapes can be adopted.

(Modification 4)

In the first embodiment, to simplify the description, a state in which the sensor 20 is not expanded/contracted and bent is set as an initial state. However, a state in which at least one of the expansion/contraction or the bend is applied to the sensor 20 may be set as an initial state. For example, a state in which the sensor 20 is wound around a wrist or the like may be set as an initial state. In this case, it is preferable that the controller IC obtain the capacitances of the first sensor SE1 and the second sensor SE2 in a state where the sensor 20 is attached to an object, a human body, and the like as initial capacitances C1(0) and C2(0).

(Modification 5)

In the first embodiment, a configuration has been described in which the controller IC 13 stores the first and second conversion tables in the memory. However, the controller IC 13 may store a first and second conversion formulas in the memory. In this case, the controller IC 13 converts the value of ΔA into the expansion amount or the contraction amount by using the first conversion formula and converts the value of ΔB into the upward bending amount or the downward bending amount by using the second conversion formula.

(Modification 6)

In the first embodiment, a configuration has been described in which the sensor module 11 concurrently measures the bend and the expansion/contraction of the sensor 20. However, the sensor module 11 may measure one of the bend and the expansion/contraction of the sensor 20.

(Modification 7)

In a case where the electronic device 10 is a wearable terminal and the like which is attached to a human body, a part having contact with the human body may include a material which hardly induces allergy, a rash, or the like. As such a material, for example, a material which is generally used for clothing, accessories, and the like (for example, silicone) can be used. The waterproof function may be added by covering the surface of the electronic device 10 with a waterproof material.

(Modification 8)

The electronic device 10 may be used as a wearable band. The shape of the wearable band changes between the time when the wearable band is attached and the time when the wearable band is not attached in general. Therefore, it is possible to automatically turn off the wearable band in a case where the band is removed by detecting the deformation of the band by the sensor 20.

2 Second Embodiment

[2.1 Configuration of Sensor]

Figure 12:
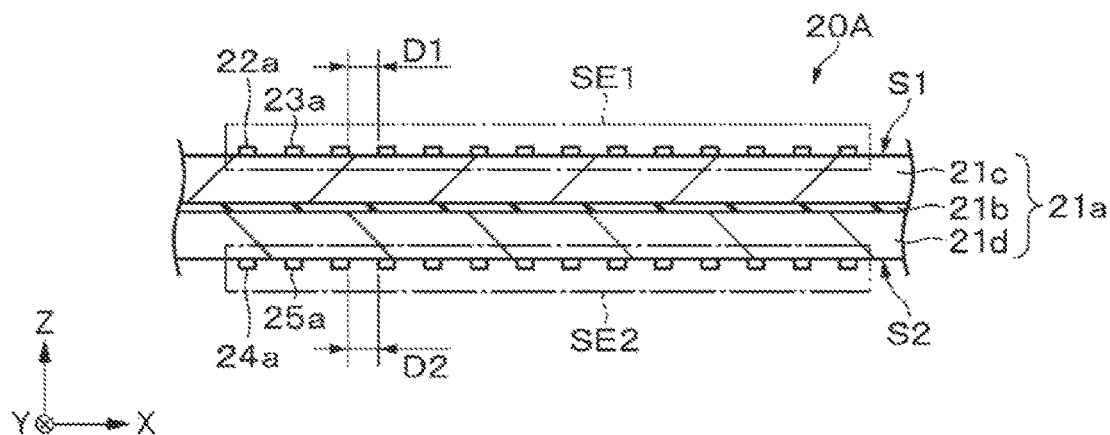
FIG. 12 is a cross-sectional view of a configuration of a sensor according to a second embodiment of the present technology.

As illustrated in FIG. 12, a sensor 20A according to a second embodiment of the present technology is different from the first embodiment in that the sensor 20A includes a base material 21a including an elastic ground electrode 21b. Note that components in the second embodiment similar to those in the first embodiment are denoted with the same reference numerals, and description thereof will be omitted.

The ground electrode 21b has, for example, a sheet-like, mesh, lattice, concentric, spiral, stripe, indefinite shapes, or the like. The ground electrode 21b includes, for example, a conductive material and a binder (binding agent). The ground electrode 21b may include an additive agent as necessary. The conductive material, the binder, the additive agent are similar to those of the first to fourth electrodes 22 to 25.

The base material 21a includes the ground electrode 21b, an elastic insulating resin layer 21c provided on a first surface of the ground electrode 21b, and an elastic insulating resin layer 21d provided on a second surface of the ground electrode 21b. The insulating resin layers 21c and 21d may include an elastic sheet and a bonding layer in which the sheet is bonded to the ground electrode 21b, and may be an elastic coating layer. As a material of the sheet, a material similar to the base material 21 according to the first embodiment can be exemplified. The bonding layer is configured of an adhesive. Herein, pressure sensitive adhesion is defined as one kind of adhesion. According to this definition, a pressure-sensitive-adhesive layer is assumed as one kind of an adhesive layer.

[2.2 Effect]

Since the sensor 20A according to the second embodiment includes the base material 21a including the elastic ground electrode 21b, crosstalk of signals of the first sensor SE1 and the second sensor S2 via the base material 21 can be prevented.

[2.3 Modification]

(Modification 1)

Figure 13A:
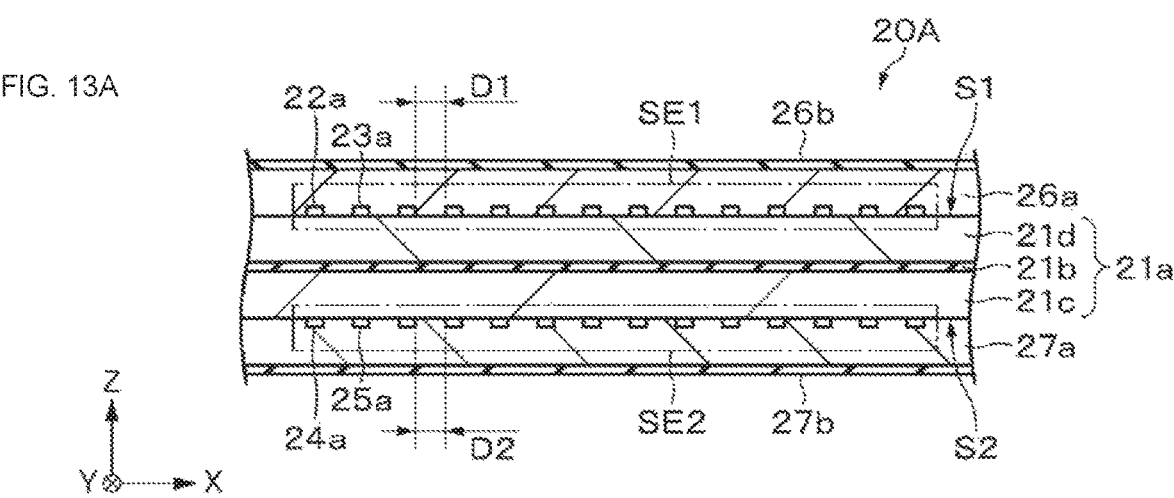
FIG. 13A is a cross-sectional view of a configuration of the sensor.

As illustrated in FIG. 13A, the sensor 20A may include a ground electrode (first ground electrode) 26b provided away from the first sensor SE1 on the first sensor SE1 and a ground electrode (second ground electrode) 25b provided away from the second sensor SE2 on the second sensor SE2. Specifically, the sensor 20A may include an elastic insulating resin layer 26a provided on a first surface S1 so as to cover first and second electrodes 22 and 23, the ground electrode 26b provided on the insulating resin layer 26a, an elastic insulating resin layer 27a provided on a second surface S2 so as to cover third and fourth electrodes 24 and 25, and the ground electrode 27b provided on the insulating resin layer 27a. The insulating resin layers 26a and 27a may have similar configurations to the insulating resin layers 21c and 21d according to the second embodiment, and may be configured of bonding layers. In a case where the insulating resin layers 26a and 27a are configured by bonding layers, it is preferable that the bonding layer include insulating fine particles. This is because a contact between the first sensor SE1 and the ground electrode 26b and a contact between the second sensor SE2 and the ground electrode 27b can be prevented. The ground electrodes 26b and 27b are similar to the ground electrode 21b according to the second embodiment.

In a case where the above configuration is adopted, an external noise (external electric field) can be prevented from entering the sensor 20A from both surfaces. Therefore, deterioration in detection accuracy or false detection of the sensor 20A caused by the external noise can be prevented. Therefore, a malfunction of the electronic device including the sensor 20A and deterioration in reliability of obtained data can be prevented.

(Modification 2)

Figure 13B:
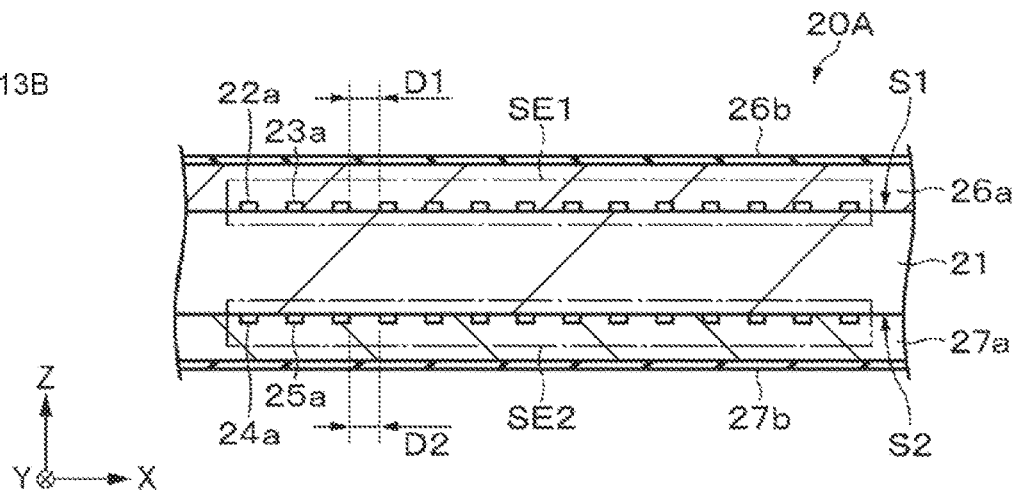
FIG. 13B is a cross-sectional view of a configuration of the sensor.

In Modification 1, as illustrated in FIG. 13B, the base material 21 may be adopted instead of the base material 21a. However, from the viewpoint of preventing crosstalk, it is preferable to adopt the base material 21a.

[Other Modifications]

The configurations described in the modifications 1 to 3 according to the first embodiment may be applied to the sensor 20A according to the second embodiment. Furthermore, the electronic device 10 according to the first embodiment may include the sensor 20A according to the second embodiment or the modifications 1 and 2 of the second embodiment instead of the sensor 20.

3 Third Embodiment

[3.1 Configuration of Electronic Device]

Figure 14:
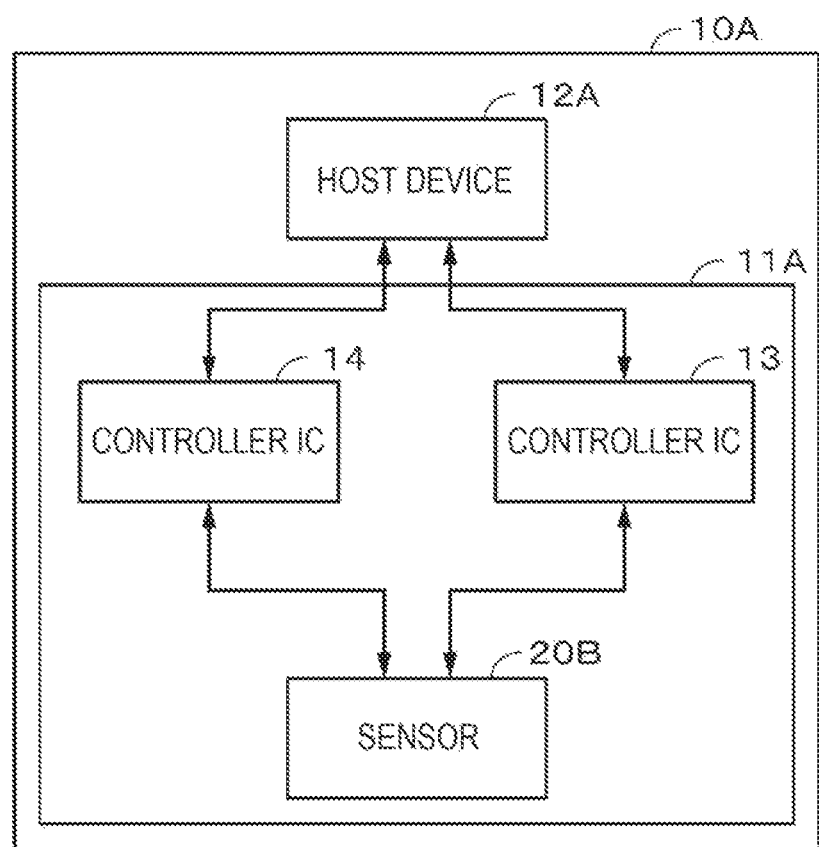
FIG. 14 is a block diagram of a configuration of an electronic device according to a third embodiment of the present technology.

As illustrated in FIG. 14, an electronic device 10A according to a third embodiment of the present technology includes a sensor module 11A and a host device 12A which is a main body of the electronic device 10A. Note that components in the third embodiment similar to those in the first embodiment are denoted with the same reference numerals, and description thereof will be omitted.

(Sensor Module)

The sensor module 11A includes a sensor 20B and controller ICs 13 and 14 as control units. The sensor module 11A can detect bend and expansion/contraction of the sensor 20B and a touch operation on the surface of the sensor 20 and outputs information according to the detection result to the host device 12A.

(Sensor)

The sensor 20 detects a capacitance according to the bend and the expansion/contraction of the sensor 20 and outputs an output signal according to the capacitance to the controller IC 13. Furthermore, a capacitance according to the touch operation on the surface of the sensor 20 is detected, and an output signal according to the capacitance is output to the controller IC 14.

(Controller IC)

The controller IC 14 calculates position coordinates of the touch operation on the basis of the output signal from the sensor 20B and outputs the detected coordinates to the host device 12A.

(Host Device)

The host device 12A executes various processing on the basis of the information supplied from the controller ICs 13 and 14. The host device 12A includes a display device. On the basis of the information associated with the position coordinates or the like of the touch operation supplied from the sensor module 11A, the host device 12A may execute processing such as to display character information, image information, and the like regarding the display device, to move a cursor displayed on the display device, and to scroll the screen.

[3.2 Configuration of Sensor]

As illustrated in FIGS. 15A and 15B, the sensor 20B according to the third embodiment of the present technology includes a first area R1 in which bend and expansion/contraction are measured and a second area R2 in which the position coordinates of the touch operation is detected. In the first area R1, a pair of a first sensor SE1 and a second sensor SE2 which face each other with the base material 21 therebetween is provided. In the second area R2, an electrostatic capacitance type third sensor SE3 to detect the position coordinates of the touch operation is provided.

The third sensor SE3 is provided on at least one of a first surface S1 or a second surface S2. Note that, in FIGS. 15A and 15B, an example in which the third sensor SE3 is provided on the first surface S1 is illustrated. The third sensor SE3 includes a plurality of sensing units SEa which is one-dimensionally arranged on at least one of the first surface S1 or the second surface S2. The sensing unit SEa includes elastic fifth and sixth electrodes 28 and 29. The fifth and sixth electrodes 28 and 29 are configured to form capacitive coupling.

The fifth electrode 28 includes a plurality of electrode element portions 28a and a coupling portion 28b. The sixth electrode 29 includes a plurality of electrode element portions 29a and a coupling portion 29b. The electrode element portions 28a and 29a and the coupling portions 28b and 29b respectively have similar configurations to the electrode element portions 22a and 23a and the coupling portions 22b and 23b.

[3.3 Effect]

The sensor 20B according to the third embodiment includes the first area R1 in which a pair of the first sensor SE1 and the second sensor SE2 facing each other with the base material 21 therebetween is provided and the second area R2 in which the third sensor SE3 is provided. Therefore, the bend and the expansion/contraction of the first area R1 can be measured, and the touch operation in the second area R2 can be detected.

[3.4 Modification]

(Modification 1)

The third sensor SE3 may include a plurality of sensing units SEa which is two-dimensionally arranged on at least one of the first surface S1 or the second surface S2. In this case, two-dimensional position coordinates (X, Y) can be detected in the second area R2.

[Other Modifications]

The configurations described in the modifications 1 to 8 according to the first embodiment may be applied to the sensor 20B and the electronic device 10A according to the third embodiment. Furthermore, in the sensor 20B according to the third embodiment, the base material 21a according to the second embodiment may be adopted, and the insulating resin layers 26a and 27a and the ground electrodes 26b and 27b in the modifications 1 and 2 according to the second embodiment may be adopted.

The embodiments and the modifications of the present technology have been specifically described above. However, the present technology is not limited to the embodiments and the modifications, and various kinds of variations based on technical ideas of the present technology are possible.

For example, the configurations, methods, processes, shapes, materials, values, and the like indicated in the embodiments and the modifications are merely examples, and configurations, methods, processes, shapes, values, and the like different from those may be used as necessary.

In addition, the configurations, methods, processes, shapes, materials, values, and the like in the embodiments and the modifications can be combined with each other without departing from the spirit of the present technology.

Furthermore, the present technology can adopt the following configuration.

(1) A sensor including:

an elastic base material including a first surface and a second surface;

a first sensor configured to detect a change in a capacitance caused by expansion/contraction of the first surface; and a second sensor configured to detect a change in a capacitance caused by expansion/contraction of the second surface, in which the first sensor faces the second sensor with the base material therebetween.

(2) The sensor according to (1), in which the first sensor is provided on the first surface and includes a first electrode and a second electrode having elasticity, and the second sensor is provided on the second surface and includes a third electrode and a fourth electrode having elasticity.

(3) The sensor according to (2), in which the first electrode and the second electrode are configured so as to form capacitive coupling, and the third electrode and the fourth electrode are configured so as to form capacitive coupling.

(4) The sensor according to (2) or (3), in which the first electrode and the second electrode include electrode element portions alternately provided apart from each other in one direction, and the third electrode and the fourth electrode include electrode element portions alternately provided apart from each other in the one direction.

(5) The sensor according to any one of (2) to (4), in which the first electrode and the second electrode have comb-teeth shapes and are provided so as to mesh comb-teeth portions with each other, and the third electrode and the fourth electrode have comb-teeth shapes and are provided so as to mesh comb-teeth portions with each other.

(6) The sensor according to any one of (2) to (5), in which one of the first electrode and the second electrode is grounded, and one of the third electrode and the fourth electrode is grounded.

(7) The sensor according to any one of (2) to (6), in which a plurality of pairs of the first sensors and the second sensors facing each other with the base material therebetween is provided, one of the first electrode and the second electrode is configured by an electrode shared by the plurality of first sensors, and the other electrode is configured by an individual electrode of the plurality of first sensors, and one of the third electrode and the fourth electrode is configured by an electrode shared by the plurality of second sensors, and the other electrode is configured by an individual electrode of the plurality of second sensors.

(8) The sensor according to any one of (1) to (7), in which the plurality of pairs of the first sensors and the second sensors facing each other with the base material therebetween is provided, and the plurality of pairs is one-dimensionally or two-dimensionally arranged in an in-plane direction of the base material.

(9) The sensor according to any one of (1) to (8), in which the first sensor and the second sensor facing each other form a sensing unit to measure bend and expansion/contraction of the sensor.

(10) The sensor according to (1) to (9), further including: an electrostatic capacitance type third sensor, on at least one of the first surface or the second surface, to detect position coordinates of a touch operation.

(11) The sensor according to (10), in which the third sensor includes a fifth electrode and a sixth electrode having elasticity.

(12) The sensor according to any one of (1) to (11), in which the base material includes a ground electrode in the base material.

(13) The sensor according to any one of (1) to (12), further including:

a first ground electrode provided on the first sensor and apart from the first sensor; and a second ground electrode provided on the second sensor and apart from the second sensor.

(14) A sensor module including:

the sensor according to any one of (1) to (13); and a control unit configured to measure bend and expansion/contraction of the sensor from capacitance of the first sensor and capacitance of the second sensor.

(15) The sensor module according to (14), in which the control unit measures the bend and the expansion/contraction of the sensor from a sum of or a difference between a change in the capacitance of the first sensor and a change in the capacitance of the second sensor.

(16) A wearable terminal including:

the sensor according to any one of (1) to (13).

(17) An electronic device including:

the sensor according to any one of (1) to (13).

REFERENCE SIGNS LIST 10, 10A Electronic device (wearable device)
11, 13 Controller IC (control unit)
12 Host device
20, 20A, 20B Sensor
21, 21a Base material
21b Ground electrode
21c, 21d Insulating resin layer
22 Electrode (first electrode)
23 Electrode (second electrode)
24 Electrode (third electrode)
25 Electrode (fourth electrode)
26a, 27a Insulating resin layer
26b Ground electrode (first ground electrode)
26b Ground electrode (second ground electrode)
22a, 23a, 24a, 25a, 28a, 29a Electrode element portion
22b, 23b, 24b, 25b, 28b, 29b Coupling portion
S1 First surface
S2 Second surface
SE1 First sensor
SE2 Second sensor
SE3 Third sensor

The invention claimed is:

1. A sensor, comprising:
an elastic base material comprising a first surface and a second surface;
a plurality of first sensors configured to detect a change in a first capacitance based on one of an expansion or a contraction of the first surface; and
a plurality of second sensors configured to detect a change in a second capacitance based on one of an expansion or a contraction of the second surface,
wherein
the plurality of first sensor faces the plurality of second sensors,
the elastic base material is between the plurality of first sensors and the plurality of second sensors,
the plurality of first sensors comprises a first electrode and a second electrode,
the first electrode comprises a first plurality of linear electrode element portions,
the second electrode comprises a second plurality of linear electrode element portions,
the first plurality of linear electrode element portions and the second plurality of linear electrode element portions are extended in a first direction,
each of the first plurality of linear electrode element portions and each of the second plurality of linear electrode element portions are arranged alternatively at a specific interval in a second direction, and
the first direction is perpendicular to the second direction.

2. The sensor according to claim 1, wherein
the plurality of first sensors is on the first surface,
the first electrode and the second electrode have elasticity,
the plurality of second sensors is on the second surface, and
the plurality of second sensors includes a third electrode and a fourth electrode having elasticity.

3. The sensor according to claim 2, wherein
the first electrode and the second electrode are configured to form capacitive coupling, and
the third electrode and the fourth electrode are configured to form capacitive coupling.

4. The sensor according to claim 2, wherein
the third electrode and the fourth electrode include third electrode element portions and fourth electrode element portions respectively, and
each of the third electrode element portions and each of the fourth electrode element portions are arranged alternately at the specific interval from each other in the second direction.

5. The sensor according to claim 2, wherein
both the first electrode and the second electrode, have comb-teeth shapes and, are provided to mesh comb-teeth portions with each other, and
both the third electrode and the fourth electrode, have comb-teeth shapes and, are provided to mesh comb-teeth portions with each other.

6. The sensor according to claim 2, wherein
one of the first electrode or the second electrode is grounded, and
one of the third electrode or the fourth electrode is grounded.

7. The sensor according to claim 2, wherein
the first electrode is a common electrode shared by the plurality of first sensors,
the second electrode is a first individual electrode of the plurality of first sensors,
the third electrode is an electrode shared by the plurality of second sensors, and
the fourth electrode is a second individual electrode of the plurality of second sensors.

8. The sensor according to claim 1, wherein
the plurality of first sensors and the plurality of second sensors are one of one-dimensionally or two-dimensionally arranged in an in-plane direction of the elastic base material.

9. The sensor according to claim 1, wherein the plurality of first sensors and the plurality of second sensors face each other to form a sensing unit to:
measure bend, and
one of an expansion or a contraction of the sensor.

10. The sensor according to claim 1, further comprising an electrostatic capacitance type third sensor, on at least one of the first surface or the second surface, configured to detect position coordinates of a touch operation.

11. The sensor according to claim 10, wherein the electrostatic capacitance type third sensor includes a fifth electrode and a sixth electrode having elasticity.

12. The sensor according to claim 1, wherein the elastic base material includes a ground electrode in the elastic base material.

13. The sensor according to claim 1, further comprising:
a first ground electrode on the plurality of first sensors; and
a second ground electrode on the plurality of second sensors.

14. A sensor module, comprising:
a sensor that comprises:
an elastic base material comprising a first surface and a second surface;
a plurality of first sensors configured to detect a change in a first capacitance based on one of an expansion or a contraction of the first surface; and
a plurality of second sensors configured to detect a change in a second capacitance based on one of an expansion or a contraction of the second surface,
wherein
the plurality of first sensors faces the plurality of second sensors,
the elastic base material is between the plurality of first sensors and the plurality of second sensors,
the plurality of first sensors comprises a first electrode and a second electrode,
the first electrode comprises a first plurality of linear electrode element portions,
the second electrode comprises a second plurality of linear electrode element portions,
the first plurality of linear electrode element portions and the second plurality of linear electrode element portions are extended in a first direction,
each of the first plurality of linear electrode element portions and each of the second plurality of linear electrode element portions are arranged alternatively at a specific interval in a second direction, and
the first direction is perpendicular to the second direction; and
a control unit configured to measure one of a bend, an expansion, or a contraction of the sensor from capacitance of at least one first sensor of the plurality of first sensors and capacitance of at least one second sensor of the plurality of second sensors.

15. The sensor module according to claim 14, wherein
the one of the bend, the expansion or the contraction of the sensor is measured based on one of a sum of or a difference between a change in the capacitance of the at least one first sensor of the plurality of first sensors and a change in the capacitance of the at least one second sensor of the plurality of second sensors.

16. A wearable terminal, comprising:
a sensor that comprises:
an elastic base material comprising a first surface and a second surface;
a plurality of first sensors configured to detect a change in a first capacitance based on one of an expansion or a contraction of the first surface; and
a plurality of second sensors configured to detect a change in a second capacitance based on one of an expansion or a contraction of the second surface,
wherein
the plurality of first sensors faces the plurality of second sensors,
the elastic base material is between the plurality of first sensors and the plurality of second sensors,
the plurality of first sensors comprises a first electrode and a second electrode,
the first electrode comprises a first plurality of linear electrode element portions,
the second electrode comprises a second plurality of linear electrode element portions,
the first plurality of linear electrode element portions and the second plurality of linear electrode element portions are extended in a first direction,
each of the first plurality of linear electrode element portions and each of the second plurality of linear electrode element portions are arranged alternatively at a specific interval in a second direction, and
the first direction is perpendicular to the second direction.

17. An electronic device, comprising:
a sensor that comprises:
an elastic base material comprising a first surface and a second surface;
a plurality of first sensors configured to detect a change in a first capacitance based on one of an expansion or a contraction of the first surface; and
a plurality of second sensors configured to detect a change in a second capacitance based on one of an expansion or a contraction of the second surface,
wherein
the plurality of first sensors faces the plurality of second sensors,
the elastic base material is between the plurality of first sensors and the plurality of second sensors,
the plurality of first sensors comprises a first electrode and a second electrode,
the first electrode comprises a first plurality of linear electrode element portions,
the second electrode comprises a second plurality of linear electrode element portions, the first plurality of linear electrode element portions and the second plurality of linear electrode element portions are extended in a first direction, each of the first plurality of linear electrode element portions and each of the second plurality of linear electrode element portions are arranged alternatively at a specific interval in a second direction, and the first direction is perpendicular to the second direction.

* * * * *